United States Patent
Hu et al.

(10) Patent No.: US 12,058,253 B2
(45) Date of Patent: *Aug. 6, 2024

(54) METHOD AND APPARATUS FOR CONTROLLING DATA ACCESS RIGHT TO DATA STORED ON A BLOCKCHAIN

(71) Applicant: HUAWEI TECHNOLOGIES CO., LTD., Shenzhen (CN)

(72) Inventors: Ruifeng Hu, Leuven (BE); Feihu Jiang, Nanjing (CN); Tsz Hon Yuen, Singapore (SG); Yaoguo Jiang, Nanjing (CN); Haojun Zhou, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,049

(22) Filed: Dec. 20, 2022

(65) Prior Publication Data

US 2023/0119065 A1 Apr. 20, 2023

Related U.S. Application Data

(63) Continuation of application No. 17/025,873, filed on Sep. 18, 2020, now Pat. No. 11,563,569, which is a
(Continued)

(30) Foreign Application Priority Data

Mar. 19, 2018 (CN) .......................... 201810224356.1

(51) Int. Cl.
*H04L 9/08* (2006.01)
*H04L 9/40* (2022.01)
(Continued)

(52) U.S. Cl.
CPC .......... *H04L 9/0891* (2013.01); *H04L 9/0822* (2013.01); *H04L 63/0884* (2013.01); *H04W 12/40* (2021.01); *H04L 9/50* (2022.05)

(58) Field of Classification Search
CPC . H04L 9/0891; H04L 9/0822; H04L 63/0884; H04L 9/50; H04L 9/085;
(Continued)

(56) References Cited

U.S. PATENT DOCUMENTS 10,404,450 B2   9/2019   Wood et al.
10,735,202 B2   8/2020   Jayachandran et al.
(Continued)

FOREIGN PATENT DOCUMENTS

CN   105453510 A   3/2016
CN   105871538 A   8/2016
(Continued)

OTHER PUBLICATIONS

Fuji Hitoshi, et al., "Cryptographic Technique that Achieves both Information Protection and Utilization in the Cloud Age," NTT Technical Journal, the Telecommunications Association, vol. 24, No. 8, pp. 18-21, total 7 pages (Aug. 2012). With English abstract.
(Continued)

*Primary Examiner* — Bryan F Wright
(74) *Attorney, Agent, or Firm* — Leydig, Voit & Mayer, Ltd.

(57) ABSTRACT

A method and an apparatus for controlling a data access right are disclosed. The method includes: receiving, by a first proxy node, a first request message from a request node, where the first request message includes an identity of the request node and an identifier of to-be-accessed data; determining a first encrypted ciphertext on a blockchain based on the identifier; determining, based on the identity, whether the request node has a right to read the first encrypted ciphertext;
(Continued)

and if yes, initiating a right verification request for the request node to at least one second proxy node, and determining, based on a feedback result of the at least one second proxy node, provisioning of the first encrypted ciphertext. A proxy node is added to the blockchain network, so that a data source can freely grant or revoke the right of the request node without modifying a ciphertext, ensuring information security.

10 Claims, 12 Drawing Sheets

Related U.S. Application Data continuation of application No. PCT/CN2019/075719, filed on Feb. 21, 2019.

(51) Int. Cl.
*H04W 12/40* (2021.01)
*H04L 9/00* (2022.01)

(58) Field of Classification Search
CPC ... H04L 9/088; H04L 9/3239; H04L 63/0442; H04L 2463/062; H04L 63/101; H04L 67/56; H04L 63/0428; H04L 63/08; H04L 63/083; H04L 63/10; H04L 63/028; H04W 12/40; G06F 21/64; G06F 21/6218
USPC .......................................................... 380/277
See application file for complete search history.

(56) References Cited

U.S. PATENT DOCUMENTS

| 10,805,084 | B1 | 10/2020 | Munson et al. |
| 2014/0205089 | A1 | 7/2014 | Irwin |
| 2016/0205114 | A1 | 7/2016 | Yan |
| 2016/0283937 | A1 | 9/2016 | Reese et al. |
| 2016/0350551 | A1 | 12/2016 | Chang et al. |
| 2017/0091397 | A1 | 3/2017 | Shah |
| 2017/0103167 | A1 | 4/2017 | Shah |
| 2019/0149325 | A1* | 5/2019 | Garagiola ............. H04L 9/3239 380/278 |

FOREIGN PATENT DOCUMENTS

| CN | 107070938 A | 8/2017 |
| CN | 107103252 A | 8/2017 |
| CN | 107181599 A | 9/2017 |
| CN | 107241360 A | 10/2017 |
| CN | 107395349 A | 11/2017 |
| EP | 3654578 A1 | 5/2020 |
| JP | 2017195627 A | 10/2017 |
| KR | 20010098954 A | 11/2001 |
| WO | 2018039722 A1 | 3/2018 |

OTHER PUBLICATIONS

Ateniese et al., "Improved Proxy Re-encryption Schemes with Applications to Secure Distributed Storage," ACM Transactions on Information and System Security, vol. 9, Issue 1, pp. 1-30 (Feb. 2006).

* cited by examiner

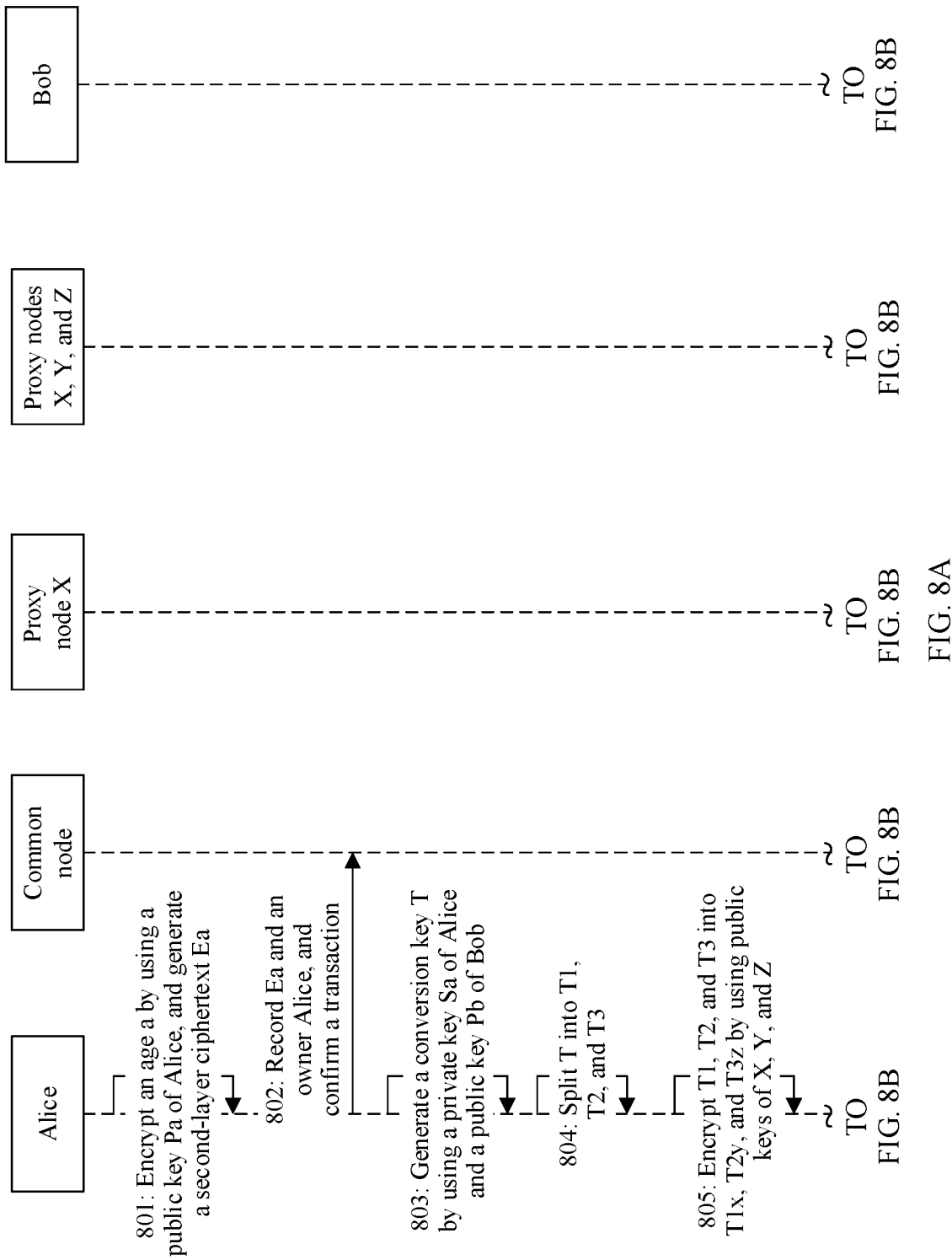

METHOD AND APPARATUS FOR CONTROLLING DATA ACCESS RIGHT TO DATA STORED ON A BLOCKCHAIN

CROSS-REFERENCE TO RELATED APPLICATIONS

This application is a continuation of U.S. patent application Ser. No. 17/025,873, filed on Sep. 18, 2020, which is a continuation of International Application No. PCT/CN2019/075719, filed on Feb. 21, 2019, which claims priority to Chinese Patent Application No. 201810224356.1, filed on Mar. 19, 2018. All of the afore-mentioned patent applications are hereby incorporated by reference in their entireties.

TECHNICAL FIELD

This application relates to the blockchain field, and in particular, to a method and an apparatus for controlling a data access right.

BACKGROUND

A blockchain is also referred to as a distributed ledger. That is, a transaction is jointly accounted by a plurality of nodes distributed at different places, and each node records a complete account. In a narrow sense, the blockchain is a chained data structure obtained by combining data blocks in a chronological order, and a distributed ledger that is protected against tampering or forging by using cryptology.

For a blockchain technology, the blockchain has features of being decentralized and trustless. Decentralized means that there is no centralized hardware or management mechanism in an entire blockchain network, rights and obligations of nodes are equal, and damage or loss of any node does not affect operation of an entire network system. Therefore, desirable robustness of the blockchain network is ensured. Trustless means that nodes do not require mutual trust to participate in data exchange in the entire network. An operation rule of the entire blockchain network system is open and transparent, and data content on all blockchain nodes is also open. Therefore, within a rule or a time range specified by the system, the nodes cannot cheat each other.

A client requests access data in a node on a blockchain network, and the node on the blockchain network provides encrypted data and a decryption key for the client. Then, the client decrypts the encrypted data by using the decryption key to obtain the access data, and records the access data on the blockchain. In this process, because historical transaction data of ledgers in a blockchain node cannot be modified or deleted, and data on a blockchain is public and cannot be canceled, once an access right is granted to a user and a decryption key is distributed, the access right cannot be revoked. In this case, when the access right of the user needs to be prohibited, the user cannot be prevented from accessing the data, causing a risk and insecurity in data access.

SUMMARY

This application provides a method and an apparatus for controlling a data access right, to control provisioning of data or ciphertext requested by a user when an access right of the user changes.

Specifically, to resolve the foregoing technical problem, this application discloses the following technical solutions:

According to a first aspect, this application provides a method for controlling a data access right. The method includes the following steps: receiving, by a first proxy node, a first request message from a request node, where the first request message includes an identity of the request node and an identifier of to-be-accessed data; determining, by the first proxy node, a first encrypted ciphertext on a blockchain based on the identifier of the to-be-accessed data, and determining, based on the identity of the request node, whether the request node has a right to read the first encrypted ciphertext; and if yes, initiating a right verification request for the request node to at least one second proxy node, and determining, based on a feedback result of the at least one second proxy node, provisioning of the first encrypted ciphertext.

Optionally, the first proxy node determines, based on the identity of the request node, whether the request node has the right to read the first encrypted ciphertext; and if the request node has no right to read the first encrypted ciphertext, the first proxy node denies a first request of the request node.

According to this method provided in this aspect, a proxy node is added to the blockchain network, so that a data source can freely grant or revoke the right of the request node without modifying a ciphertext. That is, the proxy node reads a latest right of the request node on a blockchain network to determine whether to authorize or deny an access request. If the latest right is access denial, a user may be prevented from continuing to access data, thereby ensuring information security in the network.

In addition, an identity of a requester is further verified by using the at least one second proxy node, so that a possibility that cheating occurs when only one first proxy node is used in verification can be avoided, thereby further improving verification accuracy, and further ensuring security of information transmission.

With reference to the first aspect, in an implementation of the first aspect, the determining, based on the identity of the request node, whether the request node has a right to read the first encrypted ciphertext includes: reading, on a blockchain, authorization information of the request node based on the identity of the request node, wherein the authorization information is closest to an end of a chained storage structure on the blockchain, and the authorization information includes allowing or disallowing.

In this implementation, the latest access right of the requester may be obtained by reading the authorization information of the request node, wherein the authorization information is closest to the end of the chained storage structure on the blockchain, to prepare for checking whether the request node can obtain an encrypted ciphertext and a key.

With reference to the first aspect, in another implementation of the first aspect, the initiating a right verification request for the request node to at least one second proxy node includes: determining, by the first proxy node, m second proxy nodes, where m is a positive integer greater than or equal to 1; generating the right verification request, where the right verification request includes the identity of the request node and the first encrypted ciphertext, and the first encrypted ciphertext is generated by encrypting the to-be-accessed data; and sending the right verification request to each of the m second proxy nodes.

With reference to the first aspect, in still another implementation of the first aspect, the determining, based on a feedback result of the at least one second proxy node, provisioning of the first encrypted ciphertext includes:

receiving, by the first proxy node, partial keys sent by at least k second proxy nodes, where the partial keys are generated and sent by the second proxy nodes after the second proxy nodes verify, based on the identity of the request node, that the request node has a right to access data, and k≤m; recovering the at least k partial keys to generate a conversion key; converting, by using the conversion key and an encryption algorithm, the first encrypted ciphertext into a second encrypted ciphertext, which is generated by encryption using a public key of the request node; and sending the second encrypted ciphertext to the request node.

In this implementation, the first proxy node sends right verification requests to the plurality of second proxy nodes, and can recover the conversion key only after obtaining a sufficient quantity of partial keys sent by the second proxy nodes. That is, the conversion key can be generated only after the plurality of second proxy nodes participate in joint decryption, and a single node or key participant cannot obtain the conversion key or the ciphertext, so that a few nodes are effectively prevented from obtaining the ciphertext by bypassing right control in a cheating manner. This method increases decryption complexity, effectively ensures security of transmission and reading of the ciphertext, and prevents an unauthorized user from reading the ciphertext or the data.

With reference to the first aspect, in still another implementation of the first aspect, the determining, based on a feedback result of the at least one second proxy node, provisioning of the first encrypted ciphertext includes: if the first proxy node receives partial keys sent by less than k second proxy nodes, or receives a denial message fed back by at least one second proxy node, sending an access denial message to the request node.

With reference to the first aspect, in still another implementation of the first aspect, the receiving, by a first proxy node, a first request message from a request node includes: receiving, by the first proxy node, the first request message forwarded by using any blockchain node on the blockchain network.

According to a second aspect, this application further provides a data transmission method. The method may be applied to a data source or a data owner. In this aspect, a first node is used as an example, and the method includes the following steps:

obtaining, by a first node, an identity of a second node, where the identity is used to determine authorization information of the second node, the authorization information includes allowing or disallowing, and the second node is a request node or a data requester; if the authorization information is allowing, generating, by the first node, a conversion key by using a private key of the first node, a public key of the second node, and an encryption algorithm; encrypting, by the first node, the conversion key by using a public key of a proxy node on a blockchain network, to generate an encrypted partial key; and generating, by the first node, first transaction information, and recording the first transaction information on the blockchain, where the first transaction information includes the identity of the second node, the authorization information of the second node, and the encrypted partial key.

With reference to the second aspect, in an implementation of the second aspect, the encrypting, by the first node, the conversion key by using a public key of a proxy node on a blockchain network, to generate an encrypted partial key includes: splitting, by the first node, the conversion key into n partial keys by using a secret sharing algorithm, where n is a positive integer greater than or equal to 1; and selecting, by the first node, m proxy nodes from the blockchain network, and encrypting the n partial keys by using public keys of the m proxy nodes, to generate n encrypted partial keys, where m≤n.

With reference to the second aspect, in another implementation of the second aspect, the first transaction information further includes: identities of the m proxy nodes, and a minimum quantity k, of partial keys for recovering the conversion key. When a quantity of obtained partial keys is less than k, the required conversion key cannot be recovered. In this case, cheating by a few or some proxy nodes can be prevented, thereby improving security and reliability of verification.

With reference to the second aspect, in still another implementation of the second aspect, the recording the first transaction information on the blockchain includes: sending, by the first node, the first transaction information to a blockchain node on the blockchain network, broadcasting the first transaction information and reaching a consensus on the first transaction information network-wide by using the blockchain node, and storing the first transaction information.

With reference to the second aspect, in still another implementation of the second aspect, the method further includes: if the authorization information is disallowing, canceling the authorization information of the second node; generating second transaction information, where the second transaction information includes the identity of the second node and the authorization information of the second node; and recording the second transaction information on the blockchain.

With reference to the second aspect, in still another implementation of the second aspect, before the obtaining, by a first node, an identity of a second node, the method further includes: encrypting, by the first node, to-be-accessed data by using a public key of the first node and a proxy re-encryption algorithm, to generate a first encrypted ciphertext; and storing, by the first node, the first encrypted ciphertext as a transaction on the blockchain.

According to a third aspect, this application further provides a data transmission method, where the method may be applied to a second proxy node, the second proxy node may be a first proxy node or a primary proxy node, and the method includes the following steps:

receiving, by a second proxy node, a right verification request from a first proxy node, where the right verification request includes an identity of a request node and a first encrypted ciphertext, and the first encrypted ciphertext is generated by encrypting to-be-accessed data; determining, by the second proxy node based on the identity of the request node, whether the request node has a right to read the first encrypted ciphertext; and if yes, generating a partial key, and sending the partial key to the first proxy node.

In this aspect, when the first proxy node verifies that access of the request node is allowed, the second proxy node further verifies the right of the request node. When verifying that the access of the request node is allowed, the second proxy node sends the generated partial key to the first proxy node, so that the first proxy node collects the partial key and synthesizes the final conversion key, thereby effectively preventing cheating of the first proxy node, and improving security of verification.

With reference to the third aspect, in an implementation of the third aspect, the generating a partial key includes: obtaining, by the second proxy node, an encrypted partial key on a blockchain, where the encrypted partial key is generated after encryption is performed by using a public key of the second proxy node; and decrypting, by the second proxy node, the encrypted partial key by using a private key of the second proxy node, to generate the partial key.

With reference to the third aspect, in another implementation of the third aspect, the method further includes: determining, by the second proxy node based on the identity of the request node, whether the request node has the right to read the first encrypted ciphertext; and if the request node has no right to read the first encrypted ciphertext, denying a first request of the first proxy node.

According to a fourth aspect, this application further provides an apparatus for controlling a data access right. For example, the apparatus may be a network node, or may be configured in the network node. The apparatus or the network node may be the first proxy node, the first node, or the second proxy node in the foregoing aspects, and the apparatus includes units configured to perform the method steps in the first aspect to the third aspect and the implementations of the aspects.

Specifically, the apparatus includes a receiving unit, a processing unit, and a sending unit. In addition, the apparatus may further include another unit or module such as a storage unit. This is not limited in this application.

According to a fifth aspect, this application further provides a network node. The network node includes a processor, a transceiver, and a memory. When the network node is a first proxy node, the transceiver is configured to receive a first request message from a request node, where the first request message includes an identity of the request node and an identifier of to-be-accessed data; and the processor is configured to: determine a first encrypted ciphertext on a blockchain based on the identifier of the to-be-accessed data, and determine, based on the identity of the request node, whether the request node has a right to read the first encrypted ciphertext; and if not, deny a first request of the request node, or if yes, initiate a right verification request for the request node to at least one second proxy node, and determine, based on a feedback result of the at least one second proxy node, provisioning of the first encrypted ciphertext.

With reference to the fifth aspect, in an implementation of the fifth aspect, the processor is specifically configured to read, on a blockchain, authorization information of the request node based on the identity of the request node, wherein the authorization information is closest to an end of a chained storage structure on the blockchain, and the authorization information includes allowing or disallowing.

With reference to the fifth aspect, in another implementation of the fifth aspect, the processor is specifically configured to: determine m second proxy nodes, where m is a positive integer greater than or equal to 1; generate the right verification request, where the right verification request includes the identity of the request node and the first encrypted ciphertext, and the first encrypted ciphertext is generated by encrypting the to-be-accessed data; and send the right verification request to each of the m second proxy nodes by using the transceiver.

With reference to the fifth aspect, in still another implementation of the fifth aspect, the transceiver is specifically configured to receive partial keys sent by at least k second proxy nodes, where the partial keys are generated and sent by the second proxy nodes after the second proxy nodes verify, based on the identity of the request node, that the request node has a right to access data, and k≤m;

the processor is specifically configured to: recover the at least k partial keys to generate a conversion key; and convert, by using the conversion key and an encryption algorithm, the first encrypted ciphertext into a second encrypted ciphertext, which is generated by encryption using a public key of the request node; and the transceiver is specifically configured to send the second encrypted ciphertext to the request node.

With reference to the fifth aspect, in still another implementation of the fifth aspect, the processor is specifically configured to: if the first proxy node receives partial keys sent by less than k second proxy nodes, or receives a denial message fed back by at least one second proxy node, send an access denial message to the request node by using the transceiver.

With reference to the fifth aspect, in still another implementation of the fifth aspect, the transceiver is specifically configured to receive the first request message forwarded by using any blockchain node on the blockchain network.

In addition, if the network node is a second proxy node, the transceiver is configured to receive a right verification request from the first proxy node, where the right verification request includes the identity of the request node and the first encrypted ciphertext, and the first encrypted ciphertext is generated by encrypting the to-be-accessed data;

the processor is configured to: determine, based on the identity of the request node, whether the request node has the right to read the first encrypted ciphertext; and if not, deny the first request of the first proxy node, or if yes, generate the partial key; and the transceiver is further configured to send the partial key to the first proxy node.

Optionally, the processor is specifically configured to: obtain an encrypted partial key on a blockchain, where the encrypted partial key is generated after encryption is performed by using a public key of the second proxy node; and decrypt the encrypted partial key by using a private key of the second proxy node, to generate the partial key.

According to a sixth aspect, this application further provides a network node. The network node includes a processor, a transceiver, and a memory. When the network node is a data source or a data owner, for example, a first node, the transceiver is configured to obtain an identity of a second node, where the identity is used to determine authorization information of the second node, the authorization information includes allowing or disallowing; and the processor is configured to: if the authorization information is allowing, generate a conversion key by using a private key of a network node, a public key of the second node, and an encryption algorithm; encrypt the conversion key by using a public key of a proxy node on a blockchain network, to generate an encrypted partial key; and generate first transaction information, and record the first transaction information on the blockchain, where the first transaction information includes the identity of the second node, the authorization information of the second node, and the encrypted partial key.

With reference to the sixth aspect, in an implementation of the sixth aspect, the processor is specifically configured to: split the conversion key into n partial keys by using a secret sharing algorithm, where n is a positive integer greater than or equal to 1; and select m proxy nodes from the blockchain network, and encrypt the n partial keys by using public keys of the m proxy nodes, to generate n encrypted partial keys, where m≤n.

With reference to the sixth aspect, in another implementation of the sixth aspect, the first transaction information further includes: identities of the m proxy nodes, and a minimum quantity k, of partial keys for recovering the conversion key.

With reference to the sixth aspect, in still another implementation of the sixth aspect, the processor is specifically configured to: send the first transaction information to a blockchain node on the blockchain network, broadcast the first transaction information and reach a consensus on the first transaction information network-wide by using the blockchain node, and store the first transaction information.

With reference to the sixth aspect, in still another implementation of the sixth aspect, the processor is further configured to: if the authorization information is disallowing, cancel the authorization information of the second node; and generate second transaction information, and record the second transaction information on the blockchain, where the second transaction information includes the identity of the second node and the authorization information of the second node.

With reference to the sixth aspect, in still another implementation of the sixth aspect, the processor is further configured to: before obtaining the identity of the second node, encrypt to-be-accessed data by using a public key of the first node and a proxy re-encryption algorithm, to generate a first encrypted ciphertext; and store the first encrypted ciphertext as a transaction on the blockchain.

According to a seventh aspect, this application further provides a computer storage medium. The computer storage medium may store an instruction; when the instruction is executed, some or all steps of the methods for controlling a data access right in the first aspect to the third aspect and the implementations of the first aspect to the third aspect provided in this application can be implemented.

According to an eighth aspect, this application further provides a computer program product including an instruction. When the instruction is run on a computer, the computer performs the methods in the foregoing aspects.

BRIEF DESCRIPTION OF DRAWINGS

FIG. 8A, FIG. 8B, and FIG. 8C are a flowchart of still another method for controlling a data access right according to this application;

DESCRIPTION OF EMBODIMENTS

Figure 1:
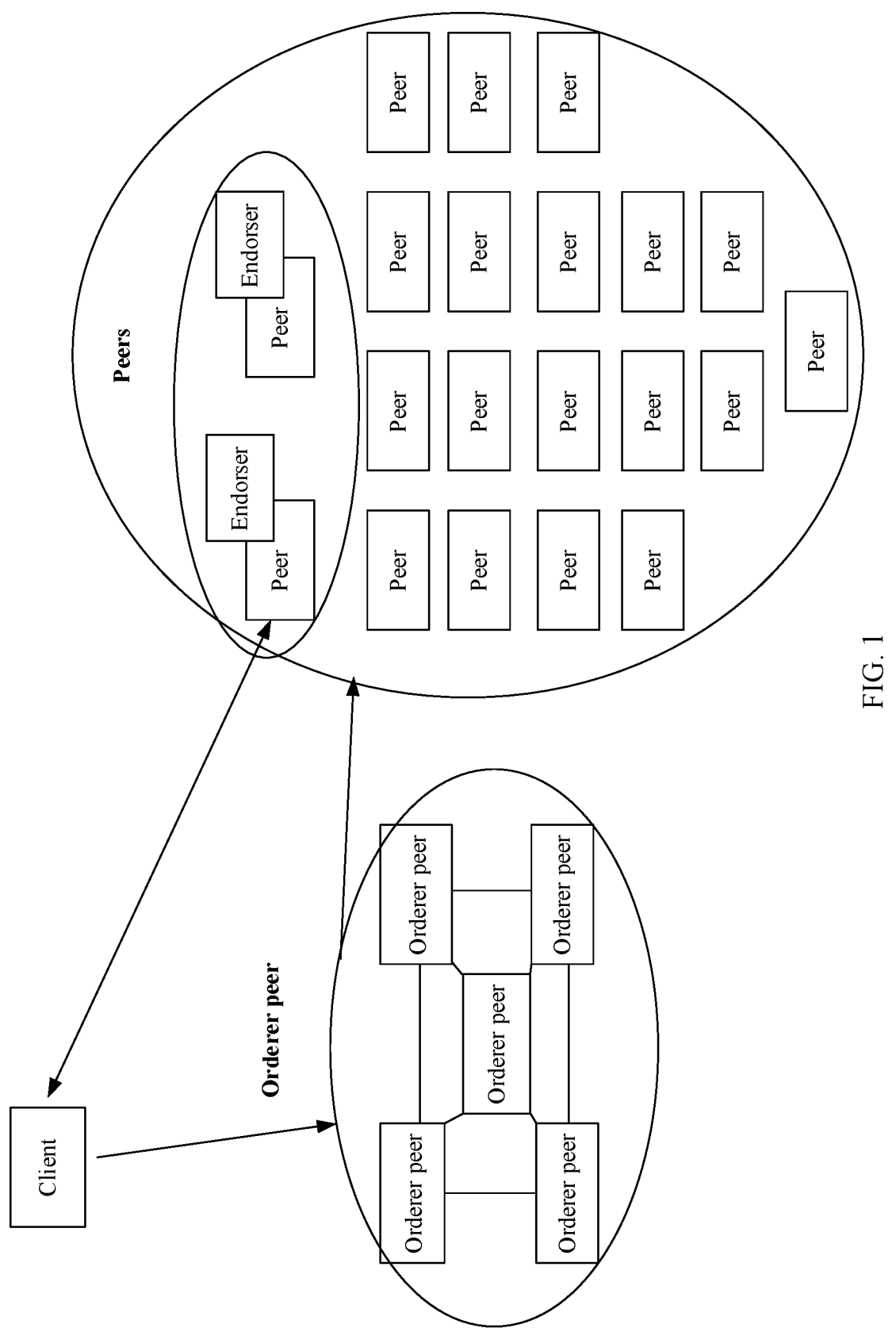
FIG. 1 is a schematic diagram of a Fabric architecture according to this application.

To make a person skilled in the art understand the technical solutions in the embodiments of this application better, and make the objectives, features, and advantages of the embodiments of this application clearer, the following further describes the technical solutions in the embodiments of this application in detail with reference to the accompanying drawings.

First, basic concepts in this application are described in detail.

The technical solutions of this application relate to a blockchain. The blockchain is a distributed database that originates from bitcoins and is an underlying technology of the bitcoins. The blockchain is a series of data blocks generated through association using cryptography. Each data block includes information about one bitcoin network transaction, and the information is used to verify validity (anti-counterfeit) of the bitcoin network transaction and generate a next block.

In a narrow sense, the blockchain is a chained data structure obtained by combining data blocks in a chronological order, and a distributed ledger that is protected against tampering or forging by using cryptology. In a broad sense, the blockchain is a distributed ledger that stores a same record by using a plurality of independent distributed nodes.

A blockchain technology is a technical solution of collectively maintaining a reliable database in a decentralized and trustless manner. Each time new data needs to be written into a blockchain, the data is aggregated into a block and added to an end of an existing blockchain. A consensus algorithm is used to ensure that newly added blocks of nodes are the same.

Several transaction records are recorded in each block, and the block includes a hash value of a previous block. For all blocks, information in a previous block is stored in this way, and the blocks are connected in sequence to form a blockchain. The blockchain is difficult to be tampered with. Based on the blockchain technology, a transaction (Tx) is directly made by two parties who can reach consensus, so that a trusted third-party centralized intermediary is not required to participate in the transaction.

A smart contract (smart contract) is an event-driven and stateful program that runs on a distributed blockchain ledger and can manage data on the ledger. The smart contract may be considered as a common computer-executable program, provided that the computer-executable program can be accurately and automatically executed. Code content of the smart contract specifies a transaction rule and logic. When a user signs and invokes the smart contract, it means that the contract content is to be executed and written into the blockchain ledger.

One of core technologies of the blockchain is a consensus algorithm, for example, a proof of work (PoW) algorithm used in bitcoins. The consensus algorithm on the blockchain applies to a consensus scenario oriented to Byzantine fault tolerance, that is, nodes on a blockchain network do not trust each other, and there may be a malicious liar node. Each node on the blockchain network may be a "liar" node. However, when a large quantity of nodes are aggregated into a network, a consensus result of the nodes is a trusted result.

A main function of the consensus algorithm is to enable all nodes on the blockchain network to record same content of valid transaction blocks.

In addition, the blockchain is also a technical mechanism for resolving a trust problem between a plurality of parties. A prerequisite for multi-party trust is that the technical mechanism is trustworthy. Therefore, the blockchain needs to be auditable. A blockchain system, the smart contract, and the consensus algorithm need to be open-source and open to the plurality of parties.

A Fabric project of Hyperledger uses a mechanism to accelerate reaching of consensus. A core of this mechanism is that a plurality of endorser peers run a smart contract and endorse running results, for example, an endorser peer signs content of a contract running result of the endorser peer, to ensure that the result is sent by the specific endorser peer. A user may set, based on an actual requirement, an endorser peer to be trusted by a smart contract of the user and a verification policy for a plurality of results, for example, set an endorse policy.

As shown in FIG. 1, a client may send a smart contract running proposal to three endorser peers. The endorse policy may require that content of three running results should be consistent, or may require that content of at least two running results should be consistent. The client collects a running result fed back by the endorser peer, and broadcasts, by using an orderer peer, a running result recorded in a transaction to the blockchain network. A node on the blockchain network, for example, an endorser peer, reads the transaction, considers the transaction as a valid transaction when verifying that the endorse policy is met, accepts modifications to data in the transaction, and writes the modifications into the blockchain.

The client or a client application interacts with a Fabric system by using a software development kit (SDK), constructs a valid transaction, and provides the transaction for the endorser peer. After sufficient support from endorser peers as required in the endorse policy is collected, a valid transaction proposal may be constructed and sent to the orderer peer or a proxy node.

The endorser peer is responsible for checking validity and rights of transactions from the client. If the transactions meet a requirement, the endorser peer signs the transactions and returns results to the client.

The orderer peer is responsible for ordering transactions and broadcasting the ordered transactions to other nodes. The orderer peer includes a node or a cluster that provides a consensus service.

A committer peer is configured to check statuses of batch transaction results that have an agreed sequence, checks whether the transactions meet a requirement of an endorse policy, ensures that a status of a variable in a read set of a ledger remains unchanged, executes a valid transaction, generates a block, and writes the block to the ledger.

To improve security of information transmission and accuracy of identity verification, the technical solutions of this application further relate to a threshold cryptosystem. The threshold cryptosystem shares private keys corresponding to a public key among a plurality of members, and a ciphertext encrypted by using the public key can be decrypted when a specified quantity of members cooperate with each other. A basis of the threshold cryptosystem is secret sharing.

Specifically, a solution of the threshold cryptosystem is to split a key into several shares, for example, into n shares, and send these shares to n participants one by one. Any t (t<n) participants or more than t participants of the n participants may cooperate to complete a decryption operation, but less than t participants cannot complete the decryption operation.

The following describes functions of all roles and a decryption process in the threshold password system.

Figure 2:
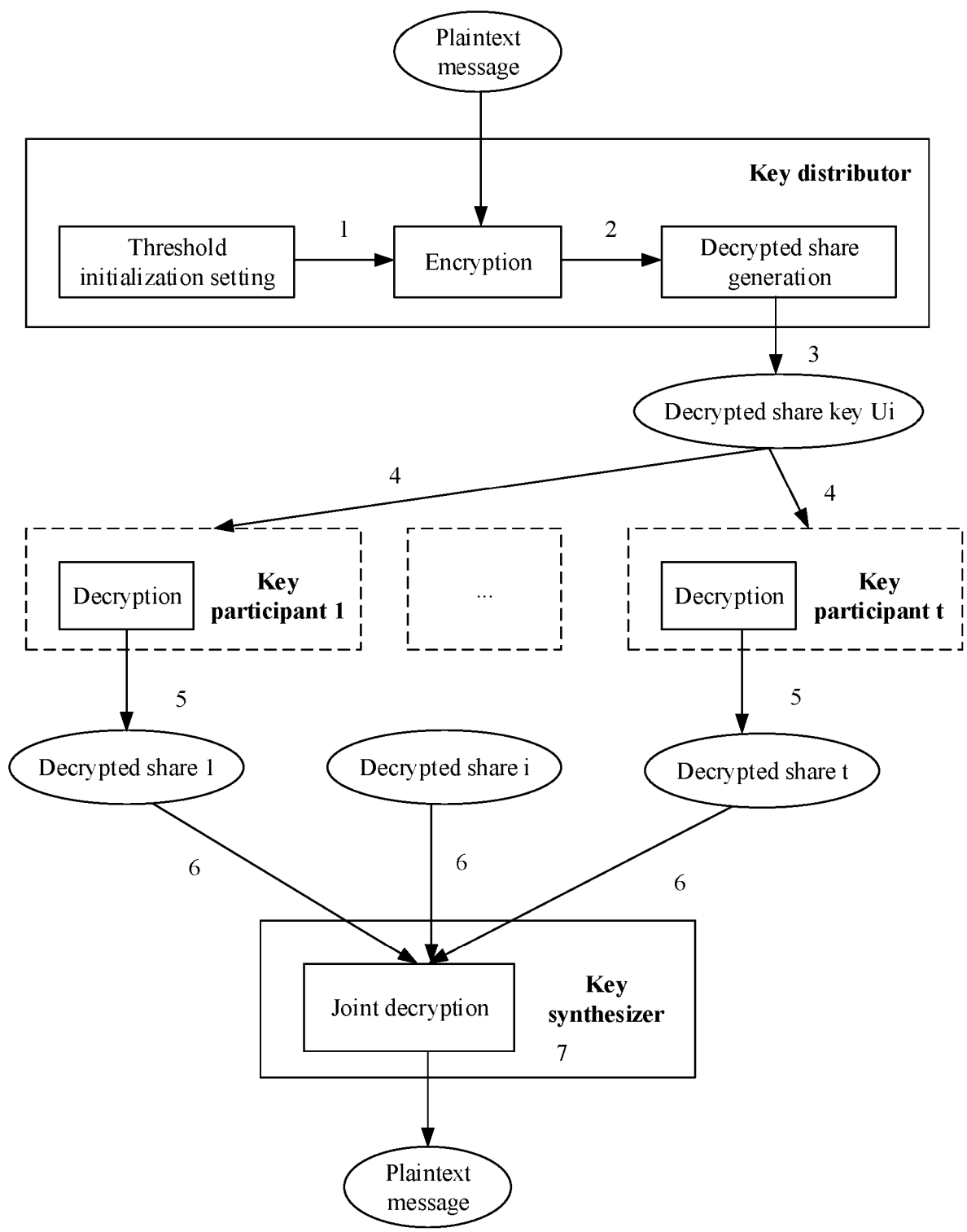
FIG. 2 is a flowchart of decryption in a threshold cryptosystem according to this application.

FIG. 2 is a schematic flowchart of decryption in a threshold cryptosystem. The threshold cryptosystem includes a key distributor, a key participant, and a key synthesizer. Further, the key distributor is configured to establish a trusted entity of the threshold cryptosystem, and is responsible for generating parameters in the threshold cryptosystem and securely sending these parameters to key sharers. The key participant is a single entity participating in a decryption operation in the threshold cryptosystem. The key synthesizer obtains decrypted shares of a plurality of participants, and verifies and decrypts these decrypted shares.

For example, as shown in FIG. 2, step 1: Threshold initialization setting. The key distributor inputs a security parameter, and the threshold cryptosystem returns a group of public parameters (which may be represented by PK), for example, n, t, and SK, where n represents a quantity of key participants, t represents a threshold, and SK indicates a primary key generated by the threshold password system. Optionally, SK=(SK1, SK2, . . . , SKn).

Step 2: Encryption. Encrypt a plaintext message by using the public parameters PK of the system and an identity ID of the key participant, and generate and output an encrypted ciphertext c.

Step 3: Key share generation. The key distributor calculates key shares Ui by using the public parameters PK of the system, the encrypted ciphertext c, and the primary key SK.

Step 4: The key distributor sends the key shares Ui to several key participants.

Step 5: The key participants obtain the key shares Ui, and each key participant decrypts the key share Ui to generate a decrypted share, for example, a decrypted share 1, . . . , and a decrypted share t.

Step 6: Each key participant sends the decrypted share generated after decryption to the key synthesizer.

Step 7: Joint decryption. The key synthesizer obtains the decrypted shares, for example, obtains t decrypted shares, verifies the t decrypted shares, synthesizes the t decrypted shares by using the public parameters PK to obtain the encrypted ciphertext c, and finally decrypts the encrypted ciphertext to obtain a plaintext message.

The technical solutions provided in this application aim to resolve the following technical problem. Once an access right on a blockchain is granted and delivered, the access right cannot be changed or revoked, and consequently a user who is not granted the right can access data. Specifically, a process in which a client requests to access data and decrypts a ciphertext on a blockchain is as follows.

Figure 3:
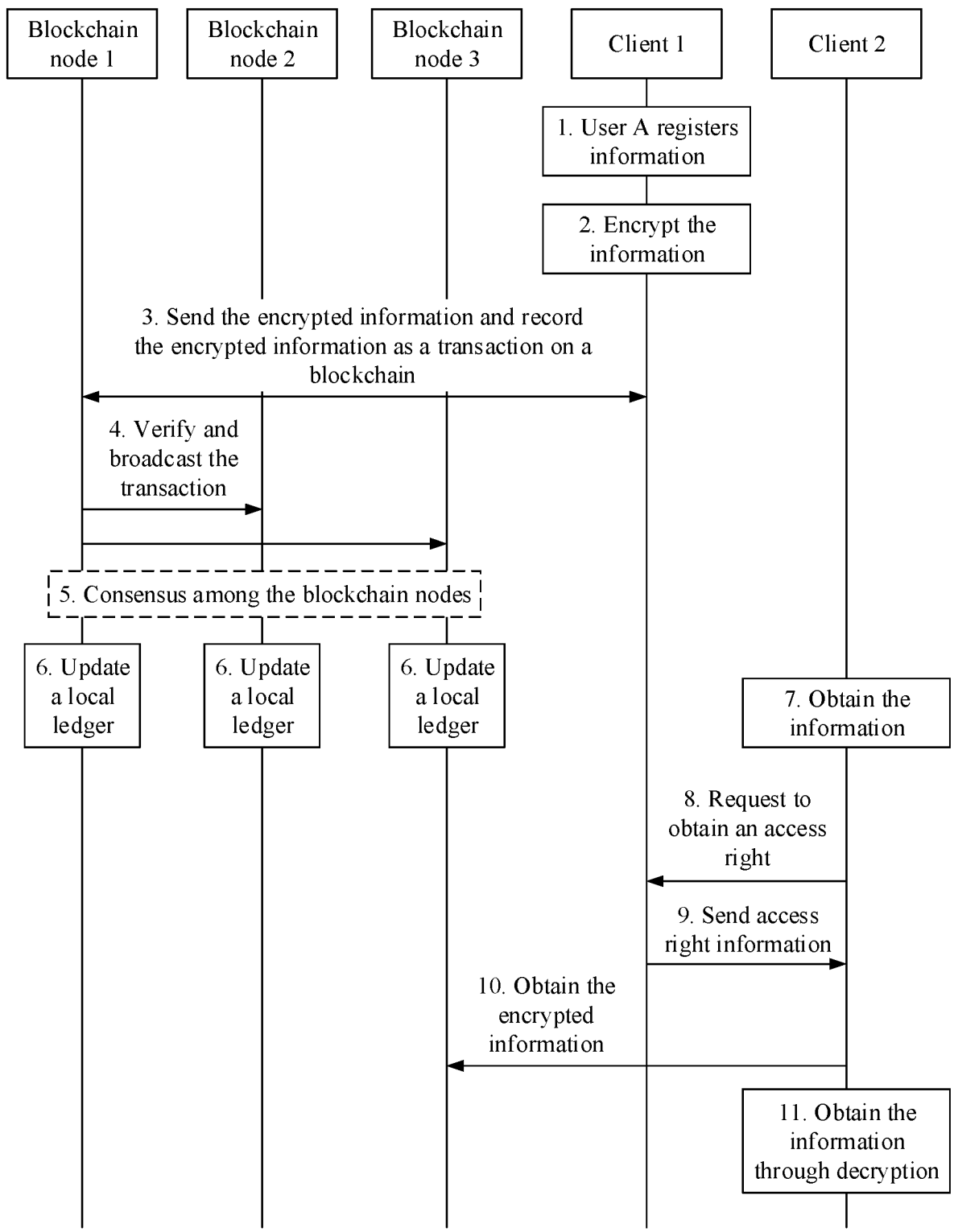
FIG. 3 is a flowchart for requesting, by a client, access data on a blockchain according to this application.

As shown in FIG. 3, step 1: A user A generates information, for example, plaintext information, by using registration information of a client 1.

Step 2: The client 1 encrypts the information by using a symmetric key.

Step 3: The client 1 sends the encrypted information, and records, in a blockchain node 1, the encrypted information as a transaction on a blockchain.

Step 4: The blockchain node 1 verifies and broadcasts the transaction.

Step 5: The blockchain node 1, and blockchain nodes 2 and 3 reach a consensus on a block including the transaction. The blockchain nodes 1, 2, and 3 are nodes located on a same blockchain network.

The consensus may be understood as: the blockchain nodes 1, 2, and 3 separately check whether the transaction meets a policy, and generate corresponding verification results, where the verification results generated by the three blockchain nodes are the same.

Step 6: The blockchain node confirms that the verification results generated by the blockchain nodes 1, 2, and 3 are the same and generates a block, and adds the block to an end of a chained structure of an existing blockchain in a local ledger.

Step 7: A user B obtains information by using a client 2, for example, the plaintext information.

Step 8: The client 2 requests to obtain, from the client 1, an access right of the user B to access the plaintext information.

Step 9: The client 1 sends access right information to the client 2, where the access right information includes the symmetric key.

Step 10: The client 2 requests, from the blockchain node 3, to obtain the encrypted information stored on a blockchain ledger.

Step 11: The client 2 decrypts the information by using the symmetric key.

In the foregoing process of delivering an access right and decrypting data, because historical transaction data of ledgers in a blockchain node cannot be modified or deleted, and data on a blockchain is public and cannot be canceled, once an access right is granted to a user and a decryption key is distributed, the access right cannot be revoked. In this case, when the access right of the user needs to be prohibited, the user cannot be prevented from accessing the data, causing a risk and insecurity in data access by a user who is not granted the right.

To resolve the foregoing problem, a main idea of the technical solutions in the embodiments of this application is to add a plurality of proxy nodes to a blockchain system. In addition to a function of a common node, each proxy node is further configured to jointly verify an access right of a user and perform a ciphertext conversion operation.

Figure 4A:
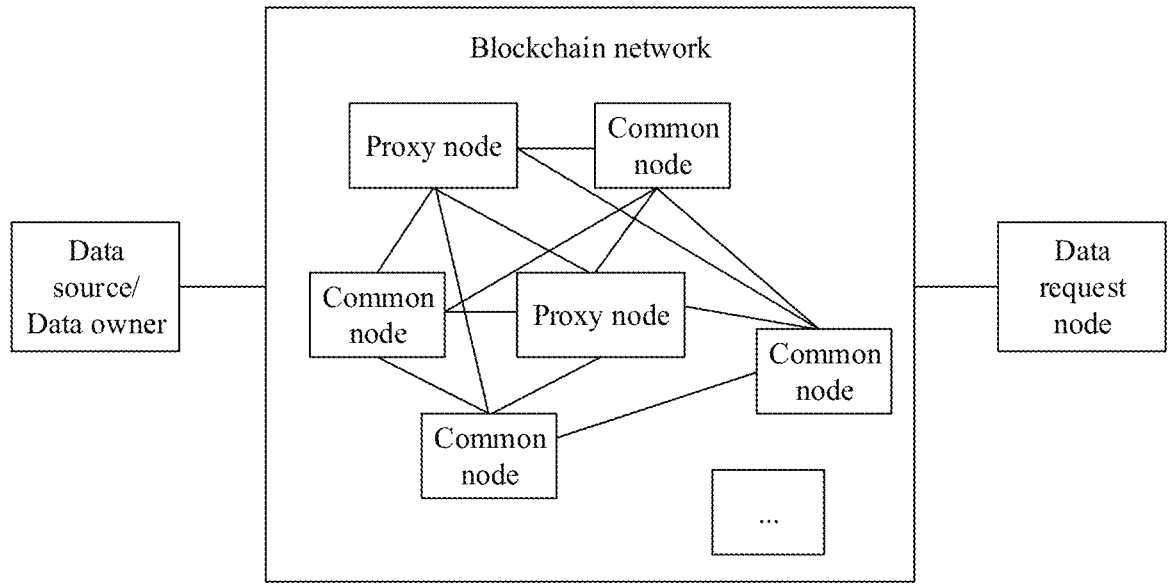
FIG. 4A is a schematic structural diagram of a blockchain system according to this application.

As shown in FIG. 4A, a blockchain system includes a data source or a data owner, at least one proxy node, a plurality of common nodes, and a data request node. The data source or data owner is a saver of data and an authorizing party of an access right. The common node may be configured to perform functions such as broadcasting, reaching a consensus on, recording, and storing a transaction on a blockchain. The user request node is a node or a client that requests to access data.

The technical solutions provided in this application mainly include three procedures: data storage, a right granting, and data requesting. Generally, first, the data source or the data owner encrypts an original ciphertext, and records and stores the original ciphertext on the blockchain.

Then, when the data source or the data owner grants a right, the data source or the data owner writes right information to the blockchain, and generates a conversion key corresponding to a node which is granted the right. The data source or the data owner divides the conversion key into several parts, and send the parts to different proxy nodes.

Finally, when the data request node requests to access data, the proxy nodes initiate consensus, read a latest access right of the data request node, and check whether the data request node has a right. If the data request node has the right, the proxy nodes collect the conversion key, convert the original ciphertext into another ciphertext that can be decrypted only by the node which is granted the right, and return the ciphertext to the request node. If the data request node does not have the right, access is denied.

It should be noted that, in the following embodiments of this application, all network devices are collectively referred to as network nodes. The network node may be a first node and a second node that send a request message, may be a blockchain node on a blockchain network, for example, a first blockchain node or a first proxy node, a relay node for forwarding, or any common node, or may be the data source.

Further, the network node includes but is not limited to a station, a base station, user equipment, a client, and a terminal. In addition, the two concepts, a device and a node, in the embodiments of this application are equivalent. In other words, the device may refer to a node, a station, UE, a network element device, a sensor, or the like.

The blockchain and the blockchain system described in this application may be applied to various networks (for example, Internet of Things), and the block or the blockchain node may be deployed in various network devices (for example, an Internet of Things device). The network device may be an industrial Internet of Things device, for example, various industrial sensors and control modules, may be a wearable device, home appliance, a home sensor, a home control module, or the like, or may be a base station, an enhanced base station, a relay with a scheduling function, a device with a base station function, or the like. The base station may be an evolved NodeB (eNB) in an LTE system, or a base station in another system. This is not limited in the embodiments of this application.

In addition, the various devices may be user equipment (UE), for example, a mobile phone, an intelligent terminal, a multimedia device, and a streaming media device. Alternatively, the UE may be another wireless network device, for example, a NodeB. Specifically, a form and a type of the wireless network device are not limited in this application.

The UE may communicate with one or more core networks over a radio access network (RAN), the UE may further access a wireless network in another manner for communication, or the UE may directly perform wireless communication with another UE. This is not limited in this embodiment of this application.

Figure 4B:
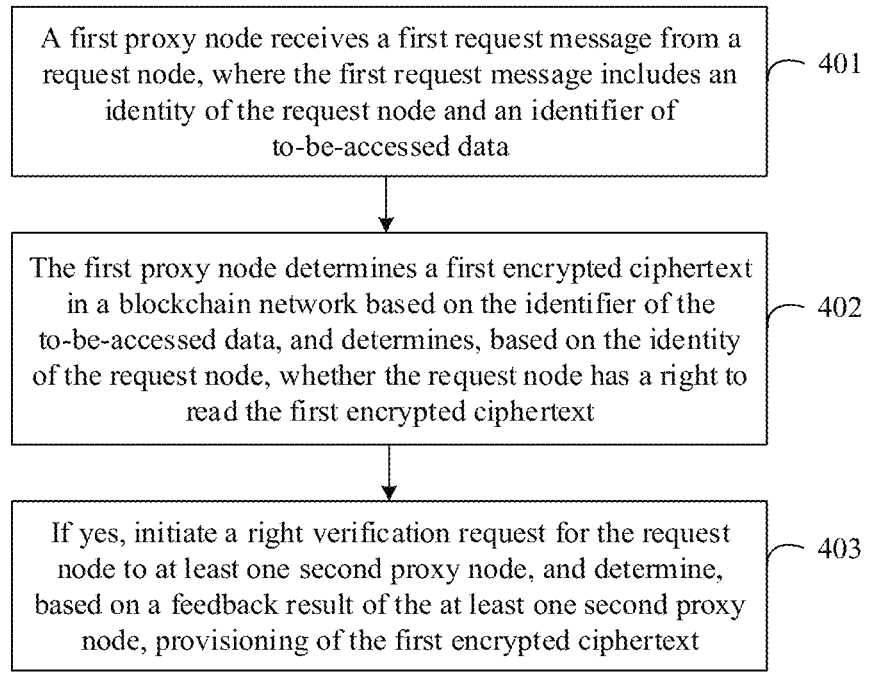
FIG. 4B is a flowchart of a method for controlling a data access right according to this application.

Referring to FIG. 4B, an embodiment of this application provides a method for controlling a data access right. The method includes the following steps.

Step 401: A first proxy node receives a first request message from a request node, where the first request message includes an identity of the request node and an identifier of to-be-accessed data.

An implementation includes: receiving, by the first proxy node, the first request message forwarded by using any blockchain node on a blockchain network.

Step 402: The first proxy node determines a first encrypted ciphertext on the blockchain based on the identifier of the to-be-accessed data, and determines, based on the identity of the request node, whether the request node has a right to read the first encrypted ciphertext.

In step 402, the determining, based on the identity of the request node, whether the request node has a right to read the first encrypted ciphertext includes: reading, on a blockchain, authorization information of the request node based on the identity of the request node, wherein the authorization information is closest to an end of a chained storage structure on the blockchain, and the authorization information includes allowing or disallowing.

Step 403: If the request node has the right to read the first encrypted ciphertext, that is, the authorization information is allowing, the first proxy node initiates a right verification request for the request node to at least one second proxy node, and determines, based on a feedback result of the at least one second proxy node, provisioning of the first encrypted ciphertext.

In addition, if the first proxy node determines that the request node has no right to read the first encrypted ciphertext, the first proxy node denies a first request of the request node.

In step 403, the initiating, by the first proxy node, a right verification request for the request node to at least one second proxy node includes:

determining, by the first proxy node, m second proxy nodes, where m is a positive integer greater than or equal to 1; generating the right verification request, where the right verification request includes the identity of the request node and the first encrypted ciphertext, and the first encrypted ciphertext is generated by encrypting the to-be-accessed data; and sending the right verification request to each of the m second proxy nodes.

Optionally, the determining, by the first proxy node based on a feedback result of the at least one second proxy node, provisioning of the first encrypted ciphertext includes:

receiving, by the first proxy node, partial keys sent by at least k second proxy nodes, where the partial keys are generated and sent by the second proxy nodes after the second proxy nodes verify, based on the identity of the request node, that the request node has a right to access data, and k≤m; recovering the at least k partial keys to generate a conversion key; converting, by using the conversion key and an encryption algorithm, the first encrypted ciphertext into a second encrypted ciphertext, which is generated by encryption using a public key of the request node; and sending the second encrypted ciphertext to the request node.

Further, the determining, by the first proxy node based on a feedback result of the at least one second proxy node, provisioning of the first encrypted ciphertext includes: if the first proxy node receives partial keys sent by less than k second proxy nodes, or receives a denial message fed back by at least one second proxy node, sending an access denial message to the request node.

According to this method provided in this embodiment, a proxy node is added to the blockchain network, so that a data source can freely grant or revoke the right of the request node without modifying a ciphertext. That is, the proxy node reads a latest right of the request node on a blockchain network to determine whether to authorize or deny an access request. If the latest right is access denial, a user may be prevented from continuing to access data, thereby ensuring information security in the network.

In addition, an identity of a requester is further verified by using the at least one second proxy node, so that a possibility that cheating occurs when only one first proxy node is used in verification can be avoided, thereby further improving verification accuracy, and further ensuring security of information transmission.

The second proxy node receives the right verification request from the first proxy node, where the right verification request includes the identity of the request node and the first encrypted ciphertext, and the first encrypted ciphertext is generated by encrypting the to-be-accessed data.

The second proxy node determines, based on the identity of the request node, whether the request node has the right to read the first encrypted ciphertext; and if not, the second proxy node denies the first request of the first proxy node, or if yes, the second proxy node generates a partial key, and sends the partial key to the first proxy node.

Optionally, the generating a partial key includes: obtaining, by the second proxy node, an encrypted partial key on the blockchain, where the encrypted partial key is generated after encryption is performed by using a public key of the second proxy node; and decrypting, by the second proxy node, the encrypted partial key by using a private key of the second proxy node, to generate the partial key.

In this embodiment, when the first proxy node verifies that access of the request node is allowed, the second proxy node further verifies the right of the request node. When verifying that the access of the request node is allowed, the second proxy node sends the generated partial key to the first proxy node, so that the first proxy node collects the partial key and synthesizes the final conversion key, thereby effectively preventing cheating of the first proxy node, and improving security of verification.

In a specific embodiment, the technical solutions disclosed in this application are described in detail according to the foregoing three parts of procedures.

a. Data Storage Procedure

An entity for performing an operation in the "data storage procedure" may be a data source or a data owner, or may be another node that has a function of storing data and granting a right. In this embodiment, "first node" is used to represent an entity for performing the data storage process. It may be understood that another name may also be used, for example, a data owner. This is not limited in this application.

A public key cryptograph technology is used in the data storage procedure. Specifically, the public key cryptograph may also be referred to as asymmetric cryptography, which is an algorithm of cryptography and mainly includes two keys: a public key referred to as a "public key" and a private key referred to as a "private key".

The two keys have different functions. One is used for encryption, and the other is used for decryption. For example, one of the keys is used to encrypt plaintext to obtain encrypted ciphertext, and the original plaintext can be obtained through decryption only by using the other corresponding key. That is, the encryption key cannot be used to decrypt the ciphertext and access data. Because two different keys are used to encrypt and decrypt the plaintext, this process may also be referred to as asymmetric encryption. Compared with symmetric encryption in which a same key is used for encryption and decryption, the asymmetric encryption manner has higher security. Because even if one of the two keys is obtained, an encrypted ciphertext cannot be decrypted, and the other key cannot be calculated. Therefore, the public key may be disclosed and released to others, for example, recorded on a blockchain. The private key is kept by a client or UE.

In the "data storage procedure", the first node mainly performs the following method process:

The first node encrypts a ciphertext by using a public key of the first node and an encryption algorithm, for example, a proxy re-encryption algorithm, to generate a first encrypted ciphertext Ea; and the first node stores the first encrypted ciphertext Ea as a transaction (transaction) on a blockchain.

Optionally, in a transaction storage manner, the first node sends a transaction request to any common node on the blockchain network, where the transaction request includes the first encrypted ciphertext Ea; the common node that receives the transaction request broadcasts the transaction request on the blockchain network, so that all blockchain nodes on a blockchain network reach a consensus on and store the related transaction of the first encrypted ciphertext Ea.

In addition, optionally, in another transaction storage manner, the first node directly sends a transaction request including the first encrypted ciphertext to any proxy node, for example, a first proxy node, and the first proxy node broadcasts the transaction and reaches a consensus on the transaction on the blockchain network.

b. Right Granting Procedure

Figure 5:
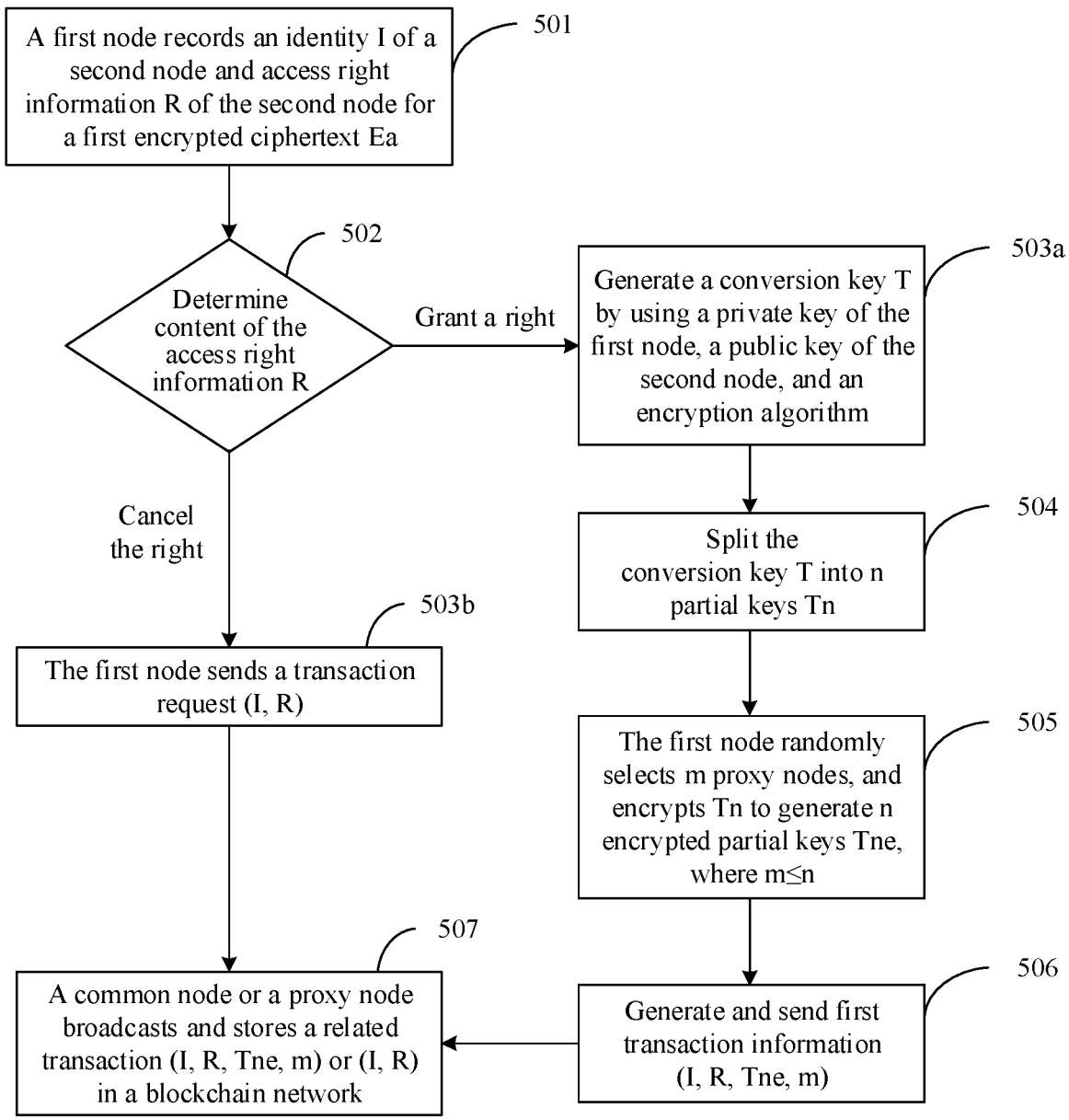
FIG. 5 is a flowchart of another method for controlling a data access right according to this application.

As shown in FIG. 5, the method includes the following steps.

Step 501: A first node records an identity I of a second node and access right information R of the second node for a first encrypted ciphertext Ea.

The second node is an authorized user, and the identity I of the second node may be a second node identifier, a user ID, a device ID, a device identifier, or the like. The access right information R includes: granting a right and canceling a right.

Step 502: Determine whether the access right information R includes content of granting a right or canceling a right.

Step 503a: If the access right information R carries the content of granting a right, the first node generates a conversion key T by using a private key of the first node, a public key of the second node, and an encryption algorithm.

Step 503b: If the access right information R carries the content of canceling a right, the first node sends a transaction request to any node on a blockchain network, where the transaction request includes the access right information R and the identity I of the second node.

Step 504: Continue the procedure of step 503a. The first node splits the conversion key T into n partial keys by using a secret sharing algorithm, where n is a positive integer greater than or equal to 1.

Optionally, the conversion key T is split into (m, Tn). Tn represents any partial key obtained through splitting, and m represents a minimum quantity Tn that can be used for recovering the conversion key T.

Step 505: The first node randomly selects m proxy nodes from the blockchain network, and encrypts the n partial keys Tn by using public keys of the m proxy nodes, to generate n encrypted partial keys Tne, where m≤n.

Step 506: The first node generates first transaction information, and sends the first transaction information to any common node or blockchain node, where the first transaction information includes at least one of the following: the identity I of the second node, authorization information (or the access right information R) of the second node, and the encrypted partial keys Tne.

Optionally, the first transaction information further includes: identities of the m proxy nodes, and a minimum quantity m of partial keys Tne for recovering the conversion key.

Step 507: The common node or the proxy node broadcasts and stores the first transaction information (I, R, Tne, m) on the blockchain, or broadcasts and records the transaction request (I, R) based on the procedure of step 503b.

c. Data Request Procedure

Figure 6A:
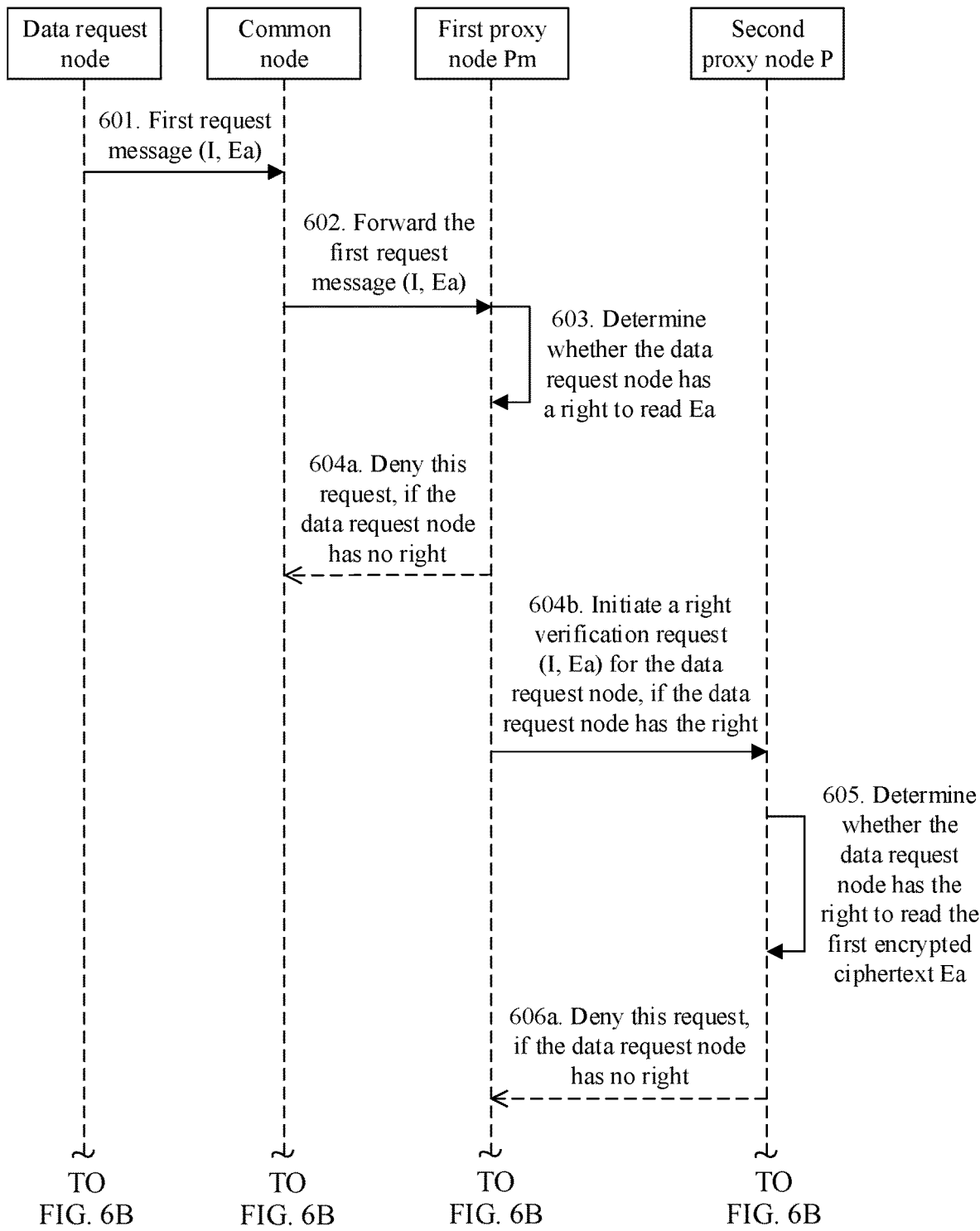
FIG. 6A and FIG. 6B are a flowchart of another method for controlling a data access right according to this application.
Figure 6B:
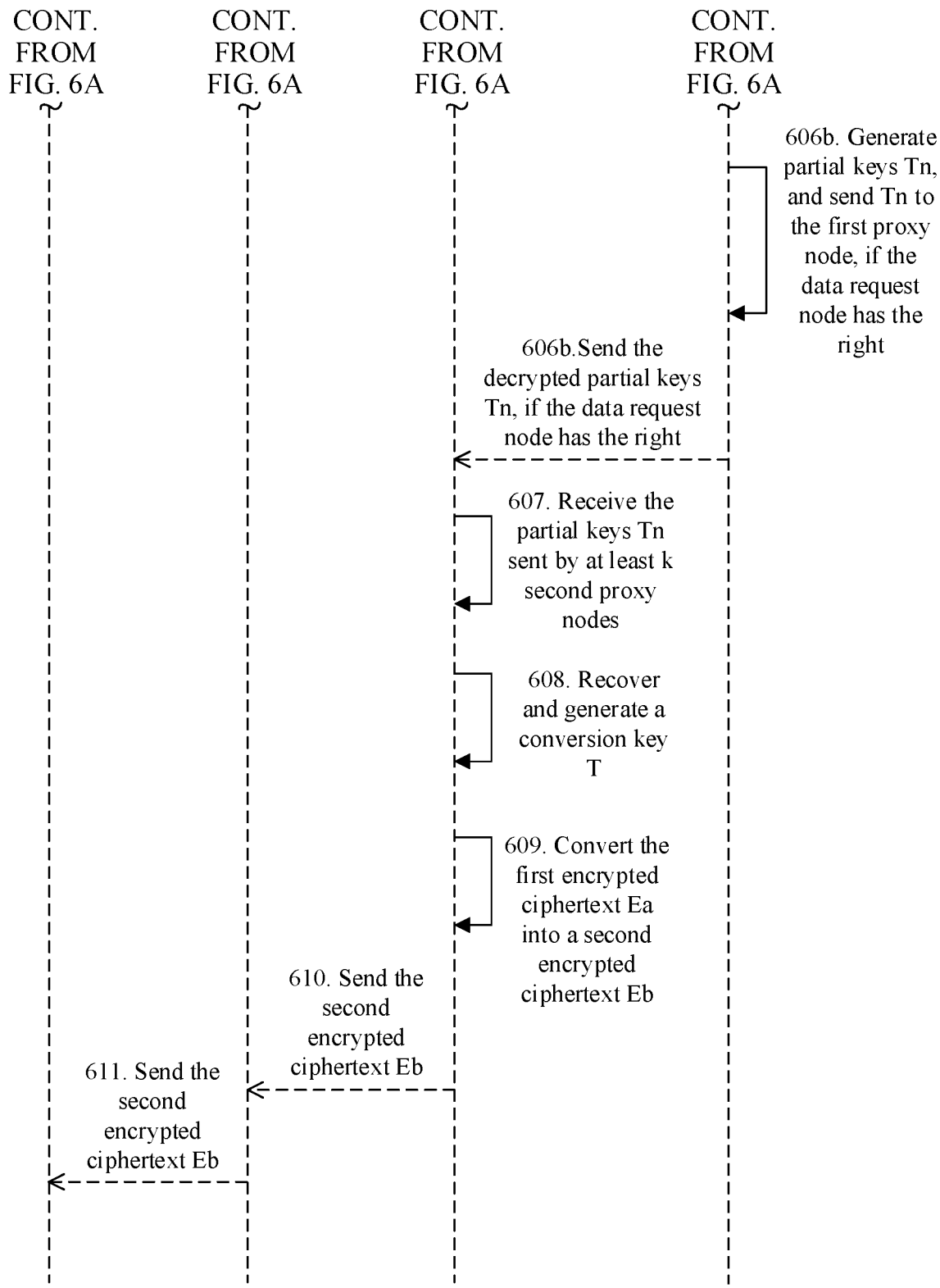

This "data request procedure" describes a process in which a request node initiates a data access request to a blockchain, and decrypts and accesses encrypted ciphertext when authorized access is met. Specifically, as shown in FIG. 6, the procedure includes the following steps.

Step 601: A data request node sends a first request message to any common node, where the first request message includes an identity I of the request node and an identifier of to-be-accessed data, or a first encrypted ciphertext Ea corresponding to the identifier of the to-be-accessed data.

Step 602: The common node receives and forwards the first request message to a first proxy node Pm.

Optionally, the first proxy node Pm may serve as a primary node of this request.

Step 603: The first proxy node Pm receives the first request message, determines the first encrypted ciphertext Ea on a blockchain based on the identifier of the to-be-accessed data carried in the first request message, and determines, based on the identity I of the request node, whether the request node has a right to read the first encrypted ciphertext Ea.

For example, the first proxy node Pm reads, on a blockchain, authorization information of the request node based on the identity I of the request node, wherein the authorization information is closest to an end of a chained storage structure on the blockchain, and the authorization information includes allowing or disallowing.

Optionally, if there are a plurality of pieces of authorization information, authorization information located in a block with a largest number is used.

Step 604a: If the data request node has no right or access is not allowed, deny this access request of the data request node.

Step 604b: If the data request node has the right or access is allowed, initiate a right verification request for the request node to at least one second proxy node P.

Selection of the second proxy node may be preset on the blockchain, or the system considers by default that blockchain nodes can discover each other.

Further, considering by default that blockchain nodes can discover each other means that: the first proxy node may learn, by using transaction information, for example, first transaction information, stored on the blockchain in the "right granting procedure", specific second proxy nodes that encrypt a partial key Tn and generate an encrypted partial key Tne, and then send the right verification request to each of these second proxy nodes.

The right verification request includes the identity I of the request node and the first encrypted ciphertext Ea.

Step 605: The second proxy node P receives a right verification request (I, Ea) from the first proxy node Pm, and determines, based on the identity I of the request node, whether the data request node has the right to read the first encrypted ciphertext Ea.

The first encrypted ciphertext Ea is generated by encrypting the to-be-accessed data.

Step 606a: If not (unauthorized), deny this access request of the data request node. For example, the second proxy node P feeds back an access denial message to the first proxy node Pm.

Step 606b: If yes (authorized), generate the partial key Tn, and send the partial key Tn to the first proxy node Pm.

Specifically, the second proxy node P reads the encrypted partial key Tne on the blockchain, and decrypts Tne by using a private key of the second proxy node P, to obtain the partial key Tn.

Step 607: The first proxy node Pm receives partial keys Tn sent by at least k second proxy nodes P, where k≤m, and m is a quantity m of second proxy nodes that are determined by the first proxy node Pm and that send the right verification request.

Step 608: The first proxy node Pm recovers the at least k partial keys Tn, to generate a conversion key T.

Step 609: The first proxy node Pm converts the first encrypted ciphertext Ea into a second encrypted ciphertext Eb by using the conversion key T and an encryption algorithm, where the second encrypted ciphertext Eb is generated after encryption is performed by using a public key of the data request node.

Step 610: The first proxy node Pm sends the second encrypted ciphertext Eb to the common node.

Step 611: The common node receives and sends the second encrypted ciphertext Eb to the data request node, so that the data request node decrypts the second encrypted ciphertext Eb by using a private key of the data request node, to obtain the to-be-accessed data.

Beneficial Effects

According to this method provided in this embodiment of this application, a proxy node is added to the blockchain network, so that a data source can freely grant or revoke the right of the request node without modifying a ciphertext. That is, the proxy node reads a latest right of the request node on a blockchain network to determine whether to authorize or deny an access request. If the latest right is access denial, a user may be prevented from continuing to access data, thereby ensuring information security in the network.

In the "right granting procedure", the data source divides the conversion key into a plurality of partial keys, and the plurality of partial keys are stored on the blockchain and held by a plurality of proxy nodes. In this way, the conversion key can be recovered only after a sufficient quantity of partial keys are obtained in the "data request procedure", a single node or key participant cannot obtain the conversion key or ciphertext, tothereby effectively preventing a few nodes from bypassing right control by cheating and obtaining the ciphertext. This method increases decryption complexity, effectively ensures security of ciphertext transmission and reading, and prevents a user who is not granted a right from reading the ciphertext or data.

In addition, when reading data, a party which is not granted a right, for example, the first proxy node and the second proxy node, cannot obtain plaintext, and consequently cannot read content of the plaintext, thereby protecting data privacy.

It should be noted that, for a process of splitting and recovering the conversion key in the "right granting procedure" and the "data request procedure" in this embodiment, refer to the functions and flowchart (as shown in FIG. 2) of the roles in the threshold cryptosystem described above.

In addition, the proxy node in this embodiment may be a proxy node or a proxy in a proxy re-encryption system, and the proxy re-encryption system is a new public key encryption system having a function of securely converting a ciphertext.

Figure 7:
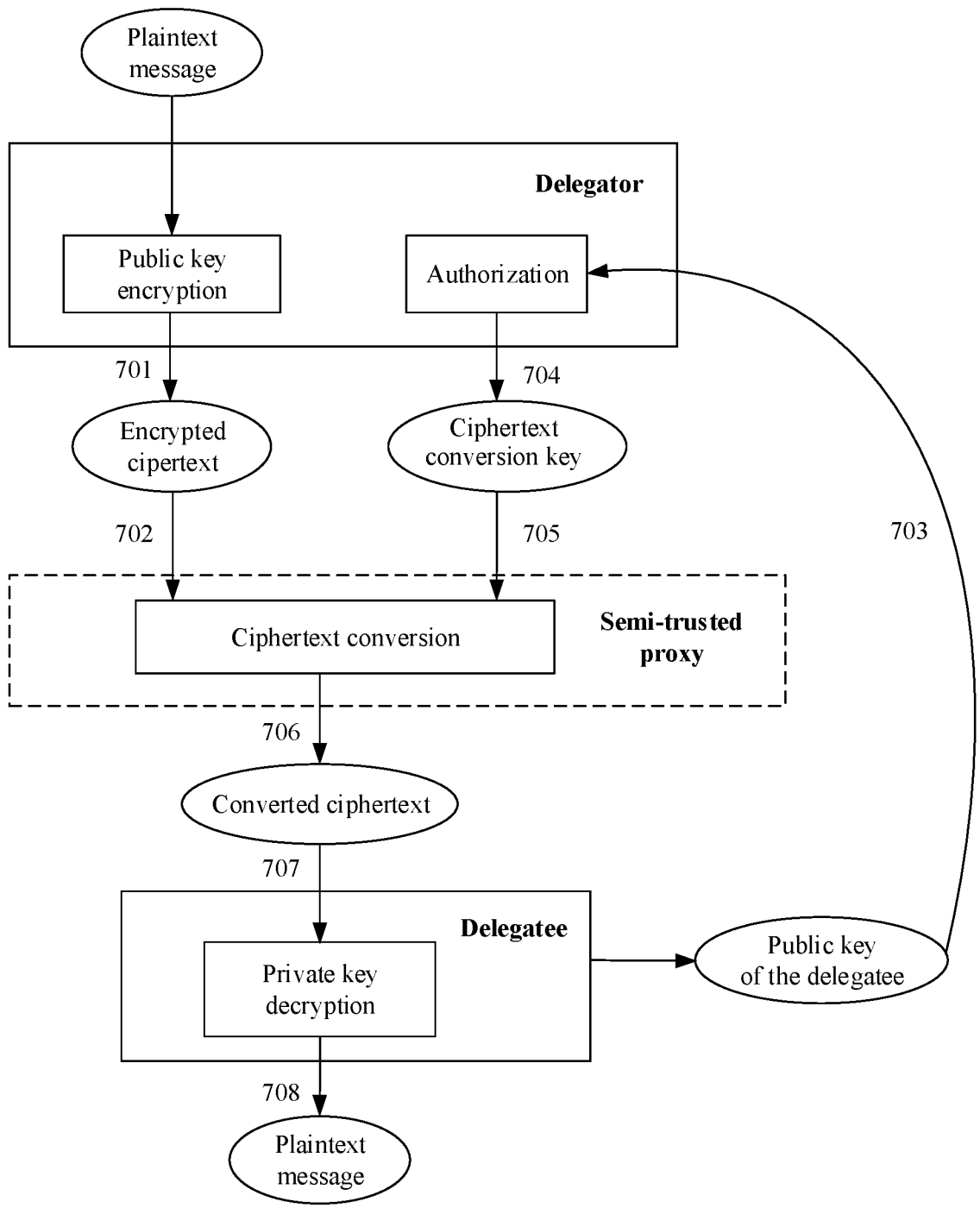
FIG. 7 is a flowchart of roles in a proxy re-encryption system according to this application.

FIG. 7 is a flowchart of roles in a proxy re-encryption system according to an embodiment. The system includes a delegator, a semi-trusted proxy, and a delegatee.

Specifically, step 701: The delegator encrypts a plaintext message by using a public key of the delegator, to generate an encrypted ciphertext.

Step 702: The delegator sends the encrypted ciphertext to the semi-trusted proxy.

Step 703: The delegator obtains a public key of the delegatee.

Step 704: The delegator authorizes a ciphertext conversion key for the delegatee.

Step 705: The delegator sends the ciphertext conversion key to the semi-trusted proxy.

Step 706: The semi-trusted proxy obtains the encrypted ciphertext from the delegator and the ciphertext conversion key for the delegatee, and the semi-trusted proxy converts the encrypted ciphertext. Specifically, the semi-trusted proxy converts the encrypted ciphertext into a ciphertext encrypted by the public key of the delegatee.

Step 707: The semi-trusted proxy sends the converted ciphertext to the delegatee.

Step 708: The delegatee obtains the converted ciphertext, and decrypts the converted ciphertext by using a private key of the delegatee, to generate the plaintext message.

In this embodiment, based on the functions of the roles in the proxy re-encryption system, a right verification process is added at the proxy nodes, and then access of a node that does not meet an authorized access right is denied, thereby controlling and changing each right on a blockchain, and improving security and reliability of data transmission.

In a specific embodiment, the method provided in this application is described in detail by using an example in which Alice stores an age of Alice on a super ledger Fabric blockchain and controls access of Bob to the age.

A system used in this embodiment is established in advance; as a user of the system, each participant generates a pair of keys (e.g., a public key and a private key). The public key has been recorded and disclosed on a blockchain A new proxy node is added to an existing Fabric blockchain network, and the new proxy node has functions such as right verification and ciphertext conversion. Three proxy nodes (e.g., X, Y, Z) are added to the Fabric blockchain network by using the following configuration file.

Figure 8B:
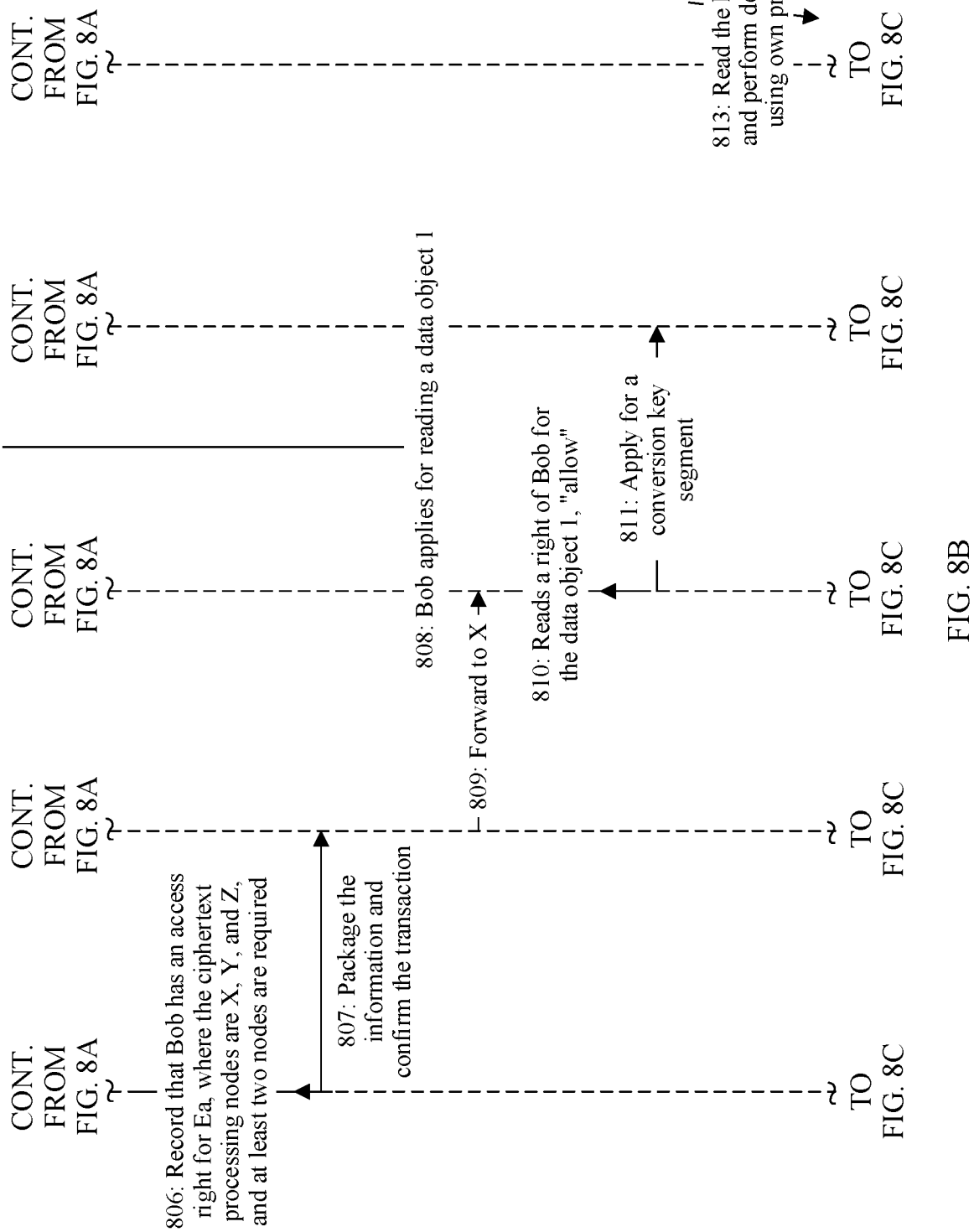
Figure 8C:
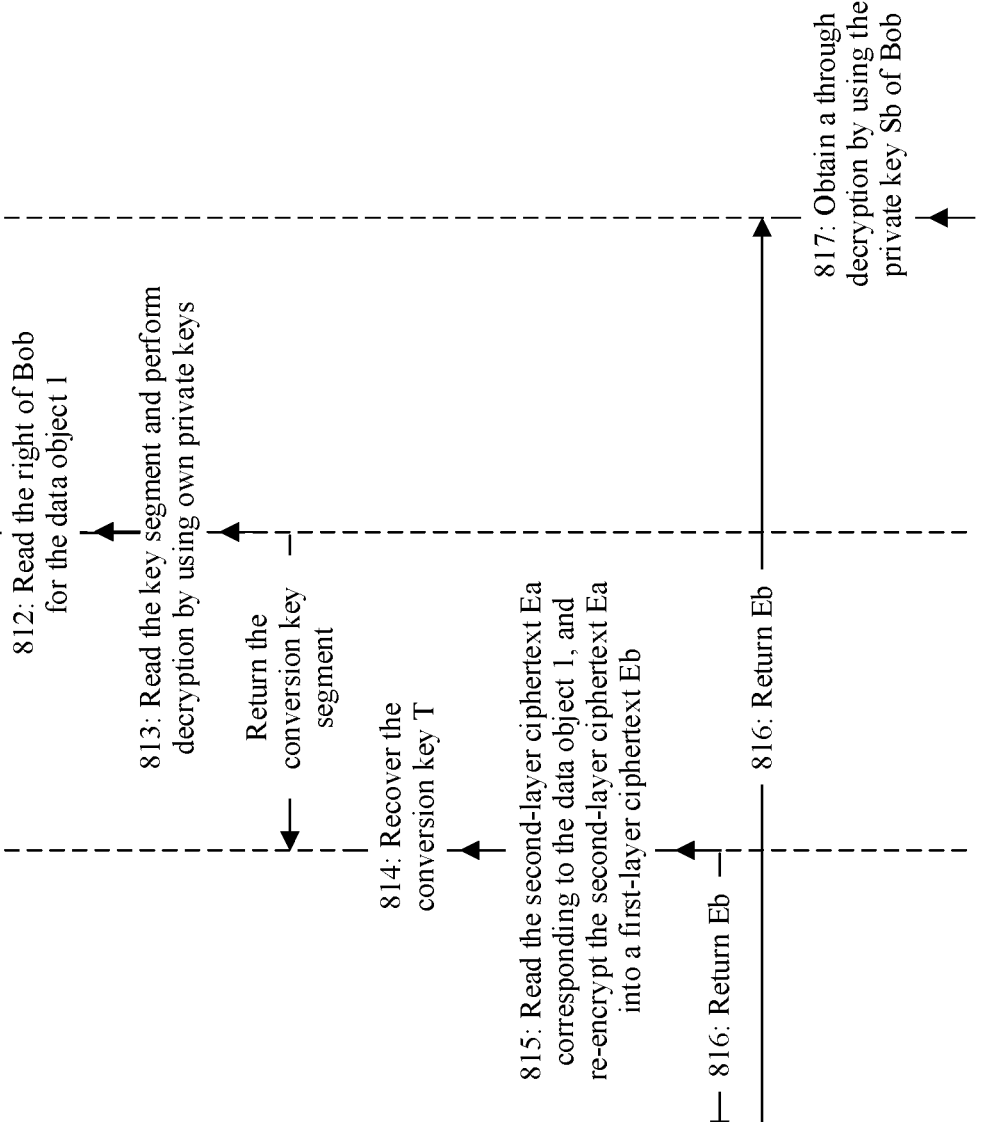

A specific procedure is shown in FIG. 8.

In a data storage procedure, Alice may perform the following method steps as a data owner or a data source.

Step 801: Alice executes proxy re-encryption on data including an age a of Alice by using a public key Pa of Alice and a proxy re-encryption algorithm, to generate a second-layer ciphertext Ea.

The proxy re-encryption algorithm may be the second-layer encryption algorithm (E2) in the proxy re-encryption algorithm described in the paper Improved Proxy Re-Encryption Schemes with Applications to Secure Distributed Storage.

Step 802: Alice packages Ea into a transaction and sends the transaction to any common node on a blockchain network. The common node receives the transaction, and broadcasts the transaction and reaches a consensus on the transaction to confirm the transaction.

Optionally,
stored data pseudocode is as follows:
Func encrypt(data){
   Ea=E2(data, Pa) //Generate the second-layer ciphertext
   Tx=Package(Ea) //Package Ea into a transaction
   Send(Tx) //Send the transaction
}
The packaged transaction is shown in Table 1.

TABLE 1

| TxIId | Tx2Type(TRANSACTION) | timestamp |
|---|---|---|
| Channel | chaincodeName | chaincode Version |
| Invoke Method: | "write Data, Ea, Alice" | |
| readSet | | |
| writeSet | Data, {Ea, Alice} | |
| Response | "SUCCESS" | |
| endorser Identity | Endorser Signature | |
| Creator Identity | Alice Signature | |

Pseudo code of recorded data that is executed by a common node is as follows:

```
func writeData(data, owner) {
  id=null:0?id++
  putState("Data", {"id":id, "data":data, "owner":owner})
  //Store data return SUCCESS
}
```

After the transaction is completed, the world state recorded on the Fabric blockchain is displayed as is shown in Table 2.

TABLE 2

| Key | Value | Version |
|---|---|---|
| Data | {id: 1, data: Ea, owner: Alice} | 1 |

Right Granting Procedure

Step 803: Alice executes a conversion key generation algorithm (RG) in the proxy re-encryption algorithm by using a private key Sa of Alice and a public key Pb of Bob, to generate a re-encryption key T, or referred to as a conversion key T.

Step 804: Alice uses the conversion key T, and sets n=3 and k=2, where n represents a quantity of shares obtained by splitting the conversion key T, and k represents a minimum quantity of proxy nodes for recovering T; and splits the conversion key T into three partial keys: T1, T2, and T3 by using a Shamir key sharing algorithm.

Step 805: Alice encrypts the partial keys T1, T2, and T3 by using public keys of the proxy nodes X, Y, and Z, to generate encrypted partial keys, for example, T1x, T2y, and T3z.

Step 806: Alice records that the requester Bob has a right to access the second-layer ciphertext Ea, the ciphertext processing nodes are X, Y, and Z, and at least two nodes are required in joint processing.

Step 807: Alice packages the foregoing information into a transaction and sends the transaction to a common node, and the common node broadcasts information about the transaction and reaches a consensus on the information about the transaction, to confirm the transaction.

Optionally,
authorization pseudocode is as follows:

```
Func Authorize(dataid, delegatee, right, threshold, division){
  T=RG(Sa, delegatee)//Generate a conversion key
  Tn=ShamirSplit(T, division, threshold)//Split the conversion key into division parts, and the conversion key can be recovered by using minimum threshold parts.
  Foreach(t in Tn){//For each key in Tn
    p=Ramdon(proxylist)//Randomly select a proxy
    Proxies+=p//Record the selected proxy
    Tne+=Encrypt(t, p.Pk) //Encrypt t by using a public key of the proxy
  }
  Tx=Package(Alice, dataid, delegatee, right, Proxies, Tne, threshold)
  Send(Tx)
}
```

The packaged transaction is shown in Table 3.

TABLE 3

| Tx1Id | Tx2 Type(TRANSACTION) | timestamp |
|---|---|---|
| Channel InvokeMethod: | Chain code Name "authorize, Alice, 1, Bob, allow, [X, Y, Z], [T1x, T2y, T3z], 2" | Chain code Version |
| readSet writeSet Response | },{ 1, Bob, allow, [X, Y, Z], [T1x, T2y, T3z], 2" "SUCCESS" Endorser Signature Alice Signature | |

Optionally, pseudocode of recording the authorization information that is executed by the common node is as follows:

```
func authorize(delegator, dataid, delegatee, right, keys, proxy, keys, threshold) {
  if delegator==data.owner{//Determine whether the authorizer is the data owner
    id=null:0?id++
    "right": right, "yes": keys})/Store the authorization information
    putState("Proxy",{"id":id,"proxy":proxy, "threshold": threshold}) //Store proxy information
    return SUCCESS
  }
  return FAIL
}
```

After the transaction is completed, the world state recorded on the Fabric blockchain is displayed as is shown in Table 4.

TABLE 4

| Key | Value | Version |
|---|---|---|
| Auth | {id:1, data: 1, delegatee: Bob, right: allow, keys: [T1x, T2y, T3z]} | 1 |
| Proxy | {id: 1, proxy: [X, Y, Z], threshold: 2} | 1 |

Data Request Procedure

Step 808: Bob initiates a data request to any common node, where the data request includes identity information Bob and a to-be-accessed data object 1.

Step 809: The common node forwards the data request to a proxy node X, where the proxy node X serves as a primary node or a first proxy node for this request.

Step 810: The proxy node X reads a latest right of Bob on the data object 1 on a blockchain, where a result of the reading is "allow".

Step 811: The proxy node X reads key processing nodes [X, Y, Z] of the data object 1, initiates a key request to each of the nodes X, Y, and Z, where the key request includes an identity of Bob and the data object 1, and starts to wait for a feedback result.

Step 812: The proxy nodes X, Y, and Z read the latest right of Bob on the data object 1 on the chain, where a result of the reading is "allow".

Step 813: When the result of reading is "allow", the proxy nodes X, Y, and Z respectively read the encrypted partial keys T1x, T2y, and T3z recorded on the chain, decrypt these encrypted partial keys by using private keys of the proxy nodes X, Y, Z, to obtain the partial keys T1, T2, and T3, and then send the partial keys to the proxy node X.

Step 814: The proxy node X receives any two of the partial keys T1, T2, and T3, for example, T1 and T2, and recovers the split partial keys to the conversion key T by using a Shamir secret sharing algorithm.

Step 815: The proxy node X reads a second-layer ciphertext Ea corresponding to the data object 1, and performs a re-encryption method (R) in the proxy re-encryption algorithm by using the conversion key T, to convert the second-layer ciphertext Ea into a first-layer ciphertext Eb that is encrypted by using the public key Pb of Bob.

Step 816: The proxy node X sends the first-layer ciphertext Eb to Bob.

Step 817: Bob receives the first-layer ciphertext Eb, and performs a decryption method (D) in the proxy re-encryption algorithm by using the private key Sb of Bob, to obtain the age of Alice, namely, a.

According to the method provided in this embodiment, a proxy node is added to a blockchain network, to control a right of any node during data transmission on the chain. To be specific, when it is found that a data request node has no right to access data, a current request of the data request node may be changed or denied, to prevent the data request node from continuing to access the data, thereby ensuring information security in the network.

In addition, based on a feature that all participants in a threshold cryptosystem cooperate with each other to complete decryption, the conversion key is split into a plurality of partial keys, and the plurality of partial keys are stored on the blockchain and held by a plurality of proxy nodes. In this way, the conversion key can be recovered only after a sufficient quantity of partial keys are obtained in the "data request procedure", a single node or key participant cannot obtain the conversion key or ciphertext, to effectively prevent a few nodes from bypassing right control by cheating and obtaining the ciphertext. This method increases decryption complexity, and improves security of data transmission and reading.

Optionally, pseudocode of reading data that is executed by the proxy node X is as follows:

```
Func ReadData(data, delegatee){
    R=ReadLastestRight(data, delegatee) //Read latest
        right information
    if(R==allow){//Determine whether the right is granted
        Proxies, Threshold=ReadProxy(data) //Read a proxy
            node that holds the conversion key
        Foreach(p in Proxies){
            Keys+=requestKey(p, data, delegatee) //Apply for
                segments of the conversion key
        }
        If(Keys.size>=Threshold){//When a quantity of collected
            key fragments is greater than a threshold
            T=Shamir.RecoverKey(Keys) //Recover the key
            Ea=ReadEncryptData(data) //Read the original cipher-
                text
            Eb=R(Ea, T) //Convert the second-layer ciphertext for
                the public key of Alice into the first-layer ciphertext
                for the public key of Bob
            Return Eb
        }
        Return FAIL //Sufficient segments of the conversion key
            are not collected
    }
    Return UNAUTHORIZED //Unauthorized
}
```

Pseudocode of reading a key that is executed by the proxy nodes X, Y, and Z is as follows:

```
Func ReadKey(data, delegatee){
    R=ReadLastesRight(data, delegatee)//Read latest right
        information
    if(R==allow){//Determine whether the right is granted
        The EKey=ReadEncryptedKey(data, delegatee)//Read
            segments of the conversion key held by the proxy
            node
        Key=Decrypt(Ekey, self.Sk) //Use the private key of
            the proxy node for decryption
        Return Key
    }
    Return UNAUTHORIZED //Unauthorized
}
```

Authorization Revoking Procedure:

In the foregoing embodiment, if Alice reads that the latest access right of Bob is "disallow", the previous authorization to Bob is revoked. A specific process is as follows:

Alice adds the right of Bob, which is "disallow", to the blockchain.

In this case, the world state recorded on the Fabric blockchain is displayed as is shown in Table 5.

TABLE 5

| Key | Value | Version |
| --- | --- | --- |
| Auth | {id: 1, data: 1, delegatee: Bob, right: disallow, keys: [T1x, T2y, T3z]} | 2 |
| Proxy | {id: 1, proxy: [X, Y, Z], threshold: 2} | 1 |

When the proxy node X finds, in a process of reading right information, that the right information indicates access denial, the proxy node X denies an access request of the request node.

It may be understood that the proxy node X may alternatively be the primary proxy node, for example, the first proxy node, or may be another proxy node, for example, the proxy nodes Y and Z.

Optionally, the method for controlling an access right in the foregoing embodiment of this application may further prevent a proxy node from cheating. Specifically, for example, in this embodiment, the conversion key is split into three parts and a threshold quantity of key sharing participants is 2. There are the following cheating cases:

Case 1: The proxy node X cheats, and continues to apply for a partial key when a right is "disallow". The proxy nodes Y and Z do not cheat, and deny the access request of the request node when finding that right information is "disallow". In this case, the proxy node X cannot obtain the conversion key.

Case 2: The proxy nodes X and Y cheat together. Although the conversion key can be obtained, for a ciphertext whose result obtained after conversion is performed by using the conversion key is Bob, the proxy nodes X and Y do not have the private key of Bob, and plaintext cannot be obtained through decryption.

Case 3: Bob cheats and cannot obtain the conversion key.

Case 4: The proxy nodes X and Y, and Bob cheat together. If Bob has not been authorized, Bob cannot obtain the conversion key.

If authorization of Bob is revoked, Bob can obtain the conversion key, and can obtain the plaintext through decryption. However, cheating costs are higher than those of a manner in which Bob buffers the plaintext during authorization. In this case, only data on which Bob has been authorized is leaked, and other data is not affected.

Figure 9:
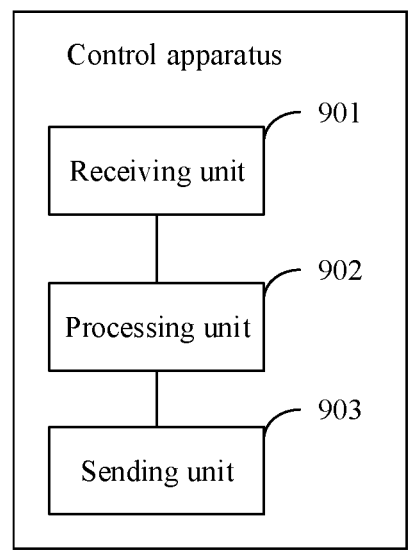
FIG. 9 is a schematic structural diagram of a network node according to this application.

FIG. 9 is a schematic structural diagram of an apparatus for controlling a data access right according to an embodiment of this application. The apparatus includes a proxy node. The apparatus may be the proxy node in the foregoing embodiments, or may be disposed on the proxy node or applied to a first proxy node, to perform the methods for controlling a right corresponding to FIG. 5 and FIG. 6.

As shown in FIG. 9, the network node includes: a receiving unit 901, a processing unit 902, and a sending unit 903. In addition, the network node may further include another unit and module, for example, a storage unit.

Specifically, the receiving unit 901 is configured to receive a first request message from a request node, where the first request message includes an identity of the request node and an identifier of to-be-accessed data.

The processing unit 902 is configured to: determine a first encrypted ciphertext on a blockchain based on the identifier of the to-be-accessed data, and determine, based on the identity of the request node, whether the request node has a right to read the first encrypted ciphertext.

The sending unit 903 is configured to: deny a first request of the request node if the request node has no right to read the first encrypted ciphertext; and initiate a right verification request for the request node to at least one second proxy node if the request node has the right.

The processing unit 902 is further configured to: determine, based on a feedback result of the at least one second proxy node, provisioning of the first encrypted ciphertext if the request node has the right.

Optionally, in a possible implementation of this embodiment, the sending unit 903 is specifically configured to read, on a blockchain, authorization information of the request node based on the identity of the request node, wherein the authorization information is closest to an end of a chained storage structure on the blockchain and the authorization information includes allowing or disallowing.

Optionally, in another possible implementation of this embodiment, the processing unit 902 is specifically configured to: determine m second proxy nodes, and generate the right verification request, where the right verification request includes the identity of the request node and the first encrypted ciphertext, the first encrypted ciphertext is generated by encrypting the to-be-accessed data, and m is a positive integer greater than or equal to 1.

The sending unit 903 is specifically configured to send the right verification request to each of the m second proxy nodes.

Optionally, in still another possible implementation of this embodiment, the receiving unit 901 is further configured to receive partial keys sent by at least k second proxy nodes, where the partial keys are generated and sent by the second proxy nodes after the second proxy nodes verify, based on the identity of the request node, that the request node has a right to access data, and k≤m.

The processing unit 902 is specifically configured to: recover the at least k partial keys to generate a conversion key; and convert, by using the conversion key and an encryption algorithm, the first encrypted ciphertext into a second encrypted ciphertext, which is generated by encryption using a public key of the request node.

The sending unit 903 is further configured to send the second encrypted ciphertext to the request node.

Optionally, in still another possible implementation of this embodiment, the processing unit 902 is specifically configured to: if receiving, by using the receiving unit, partial keys sent by less than k second proxy nodes, or receiving, by using the receiving unit, a denial message fed back by at least one second proxy node, send an access denial message to the request node by using the sending unit.

Optionally, in still another possible implementation of this embodiment, the receiving unit 901 is specifically configured to receive the first request message forwarded by using any blockchain node on the blockchain network.

The network node may be further applied to the second proxy node, and is configured to perform functions of the second proxy node, such as right verification and result feedback.

Specifically, the receiving unit 901 is configured to receive a right verification request from a first proxy node, where the right verification request includes an identity of a request node and a first encrypted ciphertext, and the first encrypted ciphertext is generated by encrypting to-be-accessed data.

The processing unit 902 is configured to: determine, based on the identity of the request node, whether the request node has a right to read the first encrypted ciphertext; and if not, deny the first request of the first proxy node, or if yes, generate a partial key. The sending unit 903 is configured to send the partial key to the first proxy node.

In addition, optionally, the processor is specifically configured to: obtain an encrypted partial key on a blockchain, where the encrypted partial key is generated after encryption is performed by using a public key of the second proxy node; and decrypt the encrypted partial key by using a private key of the second proxy node, to generate the partial key.

In addition, the network node may alternatively be a data source or a data owner, for example, a first node, and a structure of the first node is the same as the structure of the network node shown in FIG. 9. However, each unit in the network node further has the following functions.

Specifically, the receiving unit 901 is configured to obtain an identity of a second node, where the identity is used to determine authorization information of the second node, the authorization information includes allowing or disallowing.

The processing unit 902 is configured to: if the authorization information is allowing, generate a conversion key by using a private key of the network node, a public key of the second node, and an encryption algorithm; encrypt the conversion key by using a public key of a proxy node on a blockchain network, to generate an encrypted partial key; and generate first transaction information, and record the first transaction information on the blockchain, where the first transaction information includes the identity of the second node, the authorization information of the second node, and the encrypted partial key.

Optionally, in a possible implementation of this embodiment, the processing unit 902 is specifically configured to: split the conversion key into n partial keys by using a secret sharing algorithm, where n is a positive integer greater than or equal to 1; and select m proxy nodes from the blockchain network, and encrypt the n partial keys by using public keys of the m proxy nodes, to generate n encrypted partial keys, where m≤n.

The first transaction information further includes: identities of the m proxy nodes, and a minimum quantity k, of partial keys for recovering the conversion key.

Optionally, in another possible implementation of this embodiment, the processing unit 902 is specifically configured to: send the first transaction information to a blockchain node on the blockchain network, broadcast the first transaction information and reach a consensus on the first transaction information network-wide by using the blockchain node, and store the first transaction information.

Optionally, in still another possible implementation of this embodiment, the processing unit 902 is further configured to: if the authorization information is disallowing, cancel the authorization information of the second node; and generate second transaction information, and record the second transaction information on the blockchain, where the second transaction information includes the identity of the second node and the authorization information of the second node.

Optionally, in still another possible implementation of this embodiment, the processing unit 902 is further configured to: before obtaining the identity of the second node, encrypt to-be-accessed data by using a public key of the first node and a proxy re-encryption algorithm, to generate a first encrypted ciphertext; and store the first encrypted ciphertext as a transaction on the blockchain.

Figure 10:
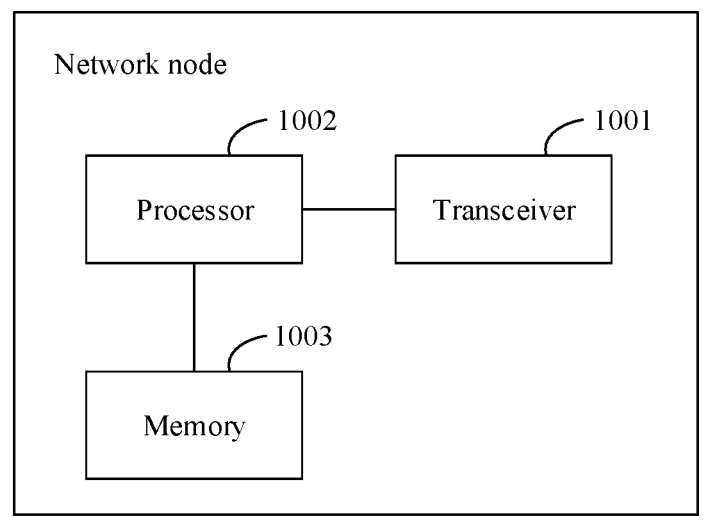
FIG. 10 is a schematic apparatus diagram of a network node according to this application.

In specific hardware implementation, as shown in FIG. 10, the network node in the foregoing embodiments includes a transceiver 1001, a processor 1002, and a memory 1003. The network node may further include more or fewer components, or combine some components, or have different component layouts. This is not limited in this application.

The transceiver 1001 is configured to: receive and send a request message and feedback information, and perform data transmission with another node in a network. The transceiver module may include a transceiver module, and the transceiver module may include communications modules such as a wireless local area network (WLAN) module, a Bluetooth module, and a base band module, and a radio frequency (RF) circuit corresponding to the communications module. The transceiver module is configured to perform communication in a wireless local area network, Bluetooth communication, infrared communication, and/or communication in a cellular communications system, for example, wideband code division multiple access (WCDMA) and/or high speed downlink packet access (HSDPA). The transceiver module is configured to control communication between all the components in the terminal device, and may support direct memory access.

As a control center of the network node, the processor 1002 is connected to various parts of the entire network node by using various interfaces and lines, and performs various functions of the network node and/or processes data by running or executing a software program and/or a module stored in the memory 1003 and invoking data stored in the memory 1003.

The processor 1002 may be formed by an integrated circuit (IC), for example, may be formed by a single packaged IC, or may be formed by connecting a plurality of packaged ICs with a same function or different functions. For example, the processor may include only a central processing unit (CPU), or may be a combination of a GPU, a digital signal processor (DSP), and a control chip (such as a baseband chip) in the transceiver. In various implementations of this application, the CPU may be a single computing core, or may include a plurality of computing cores.

The memory 1003 may include a volatile memory (volatile memory), for example, a random access memory (RAM); or may include a non-volatile memory, for example, a flash memory, a hard disk drive (HDD), or a solid-state drive (SSD); or the memory may include a combination of the foregoing types of memories. The memory may store a program or code. The processor 1002 in the network node executes the program or the code to implement the functions of the network node.

In this embodiment, a function to be implemented by the transceiver 1001 may be implemented by the receiving unit 901 and the sending unit 903 shown in FIG. 9, or may be implemented by the transceiver 1001 controlled by the processor 1002. A function to be implemented by the processing unit 902 may be implemented by the processor 1002.

In addition, this application further provides a computer storage medium. The computer storage medium may store a program. When the program is executed, some or all of the steps in the embodiments of the method for controlling a data access right and the data transmission method provided in this application may be performed. The storage medium may be a magnetic disk, an optical disk, a read-only memory ROM, a random access memory RAM, or the like.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions, for example, a verification instruction. When the computer instruction is loaded and executed on a computer, the procedures or functions described in the embodiments of this application are all or partially generated. The computer may be a general-purpose computer, a dedicated computer, a computer network, or other programmable apparatuses.

The computer instructions may be stored in a computer-readable storage medium, or may be transmitted from a computer-readable storage medium to another computer-readable storage medium. For example, the computer instructions may be transmitted from a website, a computer, a server, or a data center in a wired or wireless manner to another website, computer, server, or data center.

The computer-readable storage medium may be any usable medium accessible by a computer, or a storage device, such as a server or a data center, integrating one or more usable media. The usable medium may be a magnetic medium, for example, a soft disk, a hard disk, a magnetic tape, an optical medium (for example, a DVD), or a semiconductor medium such as a solid-state drive SSD.

In addition, it should be noted that the network node in the embodiments of this application may be a base station or an access point. For example, the base station may be a base transceiver station (BTS) in GSM or CDMA, or may be a NodeB in WCDMA, or may be an evolved NodeB (eNB or e-NodeB) in LTE. This is not limited in this application.

In addition, the network node may further be a client or a terminal device. The terminal device may be a device that provides a user with voice and/or data connectivity, a handheld device with a wireless connection function, or another processing device connected to a wireless modem.

The wireless terminal may communicate with one or more nodes over a radio access network RAN. The wireless terminal may be a mobile terminal such as a mobile phone (or referred to as a "cellular" phone), or a computer with a mobile terminal, for example, a portable, pocket-sized, handheld, computer built-in, or vehicle-mounted mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or user equipment.

In the specification, claims, and accompanying drawings of this application, the terms "first", "second", and so on (if any) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

A person skilled in the art may clearly understand that, the technologies in the embodiments of the present invention may be implemented by software in addition to a necessary general hardware platform. Based on such an understanding, the technical solutions in the embodiments of the present invention essentially or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments of the present invention.

For same or similar parts in the embodiments in this specification, refer to the embodiments. Especially, a network node or an apparatus device is basically similar to a method embodiment, and therefore is described briefly. For related parts, refer to the descriptions of the method embodiments.

The foregoing implementations of this application do not constitute a limitation on the protection scope of this application.

What is claimed is:

1. A data transmission method, wherein the method comprises:
    obtaining, by a first node, an identity of a second node, wherein the identity is used to determine authorization information of the second node;
    responsive to the authorization information being allowing, generating, by the first node, a conversion key by using a private key of the first node, a public key of the second node, and an encryption algorithm;
    encrypting, by the first node, the conversion key by using a public key of a proxy node on a blockchain network, to generate an encrypted partial key; and
    generating, by the first node, first transaction information, and recording the first transaction information on the blockchain network, wherein the first transaction information comprises the identity of the second node, the authorization information of the second node, and the encrypted partial key,
    wherein the encrypting, by the first node, the conversion key by using the public key of the proxy node on the blockchain network, to generate the encrypted partial key comprises:
    splitting, by the first node, the conversion key into n partial keys by using a secret sharing algorithm, wherein n is a positive integer greater than or equal to 1; and
    selecting, by the first node, m proxy nodes from the blockchain network, and encrypting the n partial keys by using public keys of the m proxy nodes, to generate n encrypted partial keys, wherein m≤n.

2. The method according to claim 1, wherein:
    the first transaction information further comprises: identities of the m proxy nodes, and a minimum quantity k, of partial keys for recovering the conversion key.

3. The method according to claim 1, wherein the recording the first transaction information on the blockchain network comprises:
    sending, by the first node, the first transaction information to a blockchain node on the blockchain network, broadcasting the first transaction information and reaching a consensus on the first transaction information network-wide by using the blockchain node, and storing the first transaction information.

4. The method according to claim 1, wherein the method further comprises:
    obtaining, by the first node, an identity of a third node, wherein the identity is used to determine authorization information of the third node;
    responsive to the authorization information of the third node being disallowing, canceling the authorization information of the third node;
    generating second transaction information, wherein the second transaction information comprises the identity of the third node and the authorization information of the third node; and
    recording the second transaction information on the blockchain network.

5. The method according to claim 1, wherein before the obtaining, by the first node, the identity of the second node, the method further comprises:
    encrypting, by the first node, to-be-accessed data by using a public key of the first node and a proxy re-encryption algorithm, to generate a first encrypted ciphertext; and
    storing, by the first node, the first encrypted ciphertext as a transaction on the blockchain network.

6. A network node, applied to a second proxy node and comprising:
    a memory;
    a transceiver configured to receive a right verification request from a first proxy node, wherein the right verification request comprises an identity of a request node and a first encrypted ciphertext, and the first encrypted ciphertext is generated by encrypting to-be-accessed data;
    a processor configured to execute code stored in the memory to:
    obtain an identity of a second node, wherein the identity is used to determine authorization information of the second node;
    responsive to the authorization information being allowing, generating, by the first node, a conversion key by using a private key of the first node, a public key of the second node, and an encryption algorithm;
    encrypt the conversion key by using a public key of a proxy node on a blockchain network, to generate an encrypted partial key; and
    generate first transaction information, and recording the first transaction information on the blockchain network, wherein the first transaction information comprises the identity of the second node, the authorization information of the second node, and the encrypted partial key,
    wherein the processor encrypts the conversion key by using the public key of the proxy node on the blockchain network, to generate the encrypted partial key comprises:

splitting the conversion key into n partial keys by using a secret sharing algorithm, wherein n is a positive integer greater than or equal to 1; and selecting m proxy nodes from the blockchain network, and encrypting the n partial keys by using public keys of the m proxy nodes, to generate n encrypted partial keys, wherein m≤n.

7. The network node according to claim 6, wherein the first transaction information further comprises: identities of the m proxy nodes, and a minimum quantity k, of partial keys for recovering the conversion key.

8. The network node according to claim 6, wherein the recording the first transaction information on the blockchain network comprises:

sending the first transaction information to a blockchain node on the blockchain network, broadcasting the first transaction information and reaching a consensus on the first transaction information network-wide by using the blockchain node, and storing the first transaction information.

9. A method for controlling a data access right, wherein the method comprises:

sending, by a request node to a first proxy node, a first request message, wherein the first request message comprises an identity of the request node and an identifier of to-be-accessed data;

determining, by the first proxy node, a first encrypted ciphertext on a blockchain based on the identifier of the to-be-accessed data, and determining, based on the identity of the request node, whether the request node has a right to read the first encrypted ciphertext; and responsive to determining that the request node has the right to read the first encrypted ciphertext, initiating a right verification request for the request node to at least one second proxy node, and determining, based on a feedback result of the at least one second proxy node, provisioning of the first encrypted ciphertext, wherein the initiating the right verification request for the request node to the at least one second proxy node comprises:

determining, by the first proxy node, m second proxy nodes, wherein m is a positive integer greater than or equal to 1; and sending the right verification request to each of the m second proxy nodes, wherein the right verification request comprises the identity of the request node and the first encrypted ciphertext, and the first encrypted ciphertext is generated by encrypting the to-be-accessed data, and wherein the determining, based on the feedback result of the at least one second proxy node, provisioning of the first encrypted ciphertext comprises:

sending, by at least k second proxy nodes to the first proxy node, partial keys, wherein the partial keys are generated and sent by the second proxy nodes after the second proxy nodes verify, based on the identity of the request node, that the request node has the right to read the first encrypted ciphertext, and k≤m;

recovering the at least k partial keys to generate a conversion key;

converting, by using the conversion key and an encryption algorithm, the first encrypted ciphertext into a second encrypted ciphertext encrypted by a public key of the request node; and sending the second encrypted ciphertext to the request node.

10. The method according to claim 9, wherein the determining, based on the feedback result of the at least one second proxy node, provisioning of the first encrypted ciphertext comprises:

responsive to determining that the first proxy node receives partial keys sent by less than k second proxy nodes, or receives a denial message fed back by at least one second proxy node, sending an access denial message to the request node.

* * * * *

UNITED STATES PATENT AND TRADEMARK OFFICE
CERTIFICATE OF CORRECTION

PATENT NO. : 12,058,253 B2
APPLICATION NO. : 18/069049
DATED : August 6, 2024
INVENTOR(S) : Hu et al.

Page 1 of 1

It is certified that error appears in the above-identified patent and that said Letters Patent is hereby corrected as shown below:

In the Claims

Claim 6: Column 29, Line 7: reads as "keys, wherein msn." should read as -- keys, wherein $m \leq n$. --.

Signed and Sealed this
Twenty-ninth Day of April, 2025

Coke Morgan Stewart
*Acting Director of the United States Patent and Trademark Office*